(12) United States Patent
Asai et al.

(10) Patent No.: US 12,221,066 B2
(45) Date of Patent: Feb. 11, 2025

(54) SEATING POSITION DETERMINATION SYSTEM AND VEHICLE CONTROLLER

(71) Applicants: DENSO CORPORATION, Kariya (JP); TOYOTA JIDOSHA KABUSHIKI KAISHA, Toyota (JP)

(72) Inventors: Kentaro Asai, Kariya (JP); Arata Sato, Toyota (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 77 days.

(21) Appl. No.: 18/321,956

(22) Filed: May 23, 2023

(65) Prior Publication Data

US 2023/0286464 A1 Sep. 14, 2023

Related U.S. Application Data

(63) Continuation of application No. PCT/JP2021/043312, filed on Nov. 26, 2021.

(30) Foreign Application Priority Data

Nov. 26, 2020 (JP) .................. 2020-196191

(51) Int. Cl.
*B60R 25/24* (2013.01)
*B60R 25/31* (2013.01)
(Continued)

(52) U.S. Cl.
CPC ............ *B60R 25/245* (2013.01); *B60R 25/31* (2013.01); *B60R 25/34* (2013.01); *G06F 3/14* (2013.01); *B60R 2325/205* (2013.01)

(58) Field of Classification Search
CPC ....... B60R 25/245; B60R 25/31; B60R 25/34; B60R 2325/205; H04L 63/0853;
(Continued)

(56) References Cited

U.S. PATENT DOCUMENTS 10,623,401 B1\* 4/2020 Yager ..................... H04L 67/12
2017/0276764 A1\* 9/2017 Vilermo .................. H04B 1/38
(Continued)

FOREIGN PATENT DOCUMENTS

JP 2007177476 A 7/2007
JP 2009274557 A 11/2009
(Continued)

*Primary Examiner* — Vernal U Brown
(74) *Attorney, Agent, or Firm* — Harness, Dickey & Pierce, P.L.C.

(57) ABSTRACT

In a technique for determining a seating position of each of users in a vehicle based on wireless signals from mobile devices carried by the users, a controller identifies a position of a mobile device within a distance from a door outside the vehicle via communication between exterior communicators and the mobile devices. When receiving a signal of boarding, the controller determines whether the mobile device is present in the vehicle via communication between an interior communicator and the mobile device. When the mobile device is determined to be present in the vehicle, the controller determines that a seat corresponding to the position of the mobile device is a seating position of a user corresponding to the mobile device.

18 Claims, 12 Drawing Sheets

(51) Int. Cl.
*B60R 25/34* (2013.01)
*G06F 3/14* (2006.01)

(58) Field of Classification Search
CPC ........ G06F 21/34; G06F 9/451; H04W 12/06; G01S 5/04
See application file for complete search history.

(56) References Cited

U.S. PATENT DOCUMENTS

2020/0269809 A1   8/2020  Sanji et al.
2021/0064393 A1*  3/2021  Pipe ..................... G06N 20/00

FOREIGN PATENT DOCUMENTS

| JP | 4462185 B2 | 5/2010 |
|---|---|---|
| JP | 2010196280 A | 9/2010 |
| JP | 2014133506 A | 7/2014 |
| JP | 2016215779 A | 12/2016 |
| JP | 2017118485 A | 6/2017 |

* cited by examiner

FIG. 10

| EVENT | SYSTEM RECOGNITION STATE | |
|---|---|---|
| | DRIVER SEAT | ASSISTANT DRIVER SEAT |
| Ev0: SMART KEY NOT DETECTED | UNKNOWN | UNKNOWN |
| Ev1: USER B APPROACHES DRIVER SEAT DOOR | B | UNKNOWN |
| Ev2: USER B OPENS DRIVER SEAT DOOR | B | UNKNOWN |
| Ev3: USER B IS SEATED ON DRIVER SEAT | (B) | UNKNOWN |
| Ev4: USER B CLOSES DRIVER SEAT DOOR | B | UNKNOWN |
| Ev5: USER A APPROACHES ASSISTANT DRIVER SEAT DOOR | (B) | UNKNOWN |
| Ev6: USER A OPENS ASSISTANT DRIVER SEAT DOOR | (B) | A |
| Ev7: USER A IS SEATED ON ASSISTANT DRIVER SEAT | (B) | (A) |
| Ev8: USER A CLOSES ASSISTANT DRIVER SEAT DOOR | (B) | A |

SEATING POSITION DETERMINATION SYSTEM AND VEHICLE CONTROLLER

CROSS REFERENCE TO RELATED APPLICATIONS

The present application is a continuation application of International Patent Application No. PCT/JP2021/043312 filed on Nov. 26, 2021, which designated the U.S. and claims the benefit of priority from Japanese Patent Application No. 2020-196191 filed on Nov. 26, 2020. The entire disclosures of all of the above applications are incorporated herein by reference.

TECHNICAL FIELD

The present disclosure relates to a technique for determining a seating position of a user boarding a vehicle by wirelessly communicating with a mobile device that functions as a key of the vehicle.

BACKGROUND

A vehicle electronic key system unlocks a door of a vehicle based on successful authentication via wireless communication between an in-vehicle device mounted on the vehicle and a mobile device carried by a user of the vehicle and associated with the in-vehicle device.

SUMMARY

According to an aspect of the present disclosure, a seating position of each of users of a vehicle is determined based on a receiving situation of a wireless signal from each of mobile devices carried by the users. A controller includes a mobile device detection unit, a vehicle state acquisition unit and a seating position determination unit. The controller communicates with vehicle exterior communicators and at least one vehicle interior communicator. The vehicle exterior communicators are disposed at an outer face portion of the vehicle and configured to wirelessly communicate with the mobile devices. The at least one vehicle interior communicator is disposed in a vehicle compartment of the vehicle and configured to wirelessly communicate with the mobile devices. The mobile device detection unit is configured to, based on a communication result between the vehicle exterior communicators and the mobile devices, detect a target device and identify a position of the target device outside the vehicle compartment. The target device is a mobile device positioned outside the vehicle compartment and within a predetermined distance from a door of the vehicle among the mobile devices. The vehicle state acquisition unit is configured to acquire a boarding signal from a predetermined in-vehicle sensor. The boarding signal indicates a possibility that any of the users has boarded the vehicle. The entry determination unit is configured to determine whether the target device has entered the vehicle compartment by causing the at least one vehicle interior communicator to communicate with the target device based on the vehicle state acquisition unit acquiring the boarding signal. The seating position determination unit is configured to determine that a target seat is a seating position of a user corresponding to the target device based on the entry determination unit determining the target device to be present in the vehicle compartment. The target seat is a seat of the vehicle corresponding to the position of the target device identified outside the vehicle compartment by the mobile device detection unit.

BRIEF DESCRIPTION OF THE DRAWINGS

The details of one or more embodiments are set forth in the accompanying drawings and the description below. Other features and advantages will be apparent from the description and drawings, and from the claims.

FIG. 10 is a diagram illustrating an operation result of the seating position determination unit with respect to a series of actions from when the user approaches the vehicle to when the user boards the vehicle.

DETAILED DESCRIPTION

Figure 1:
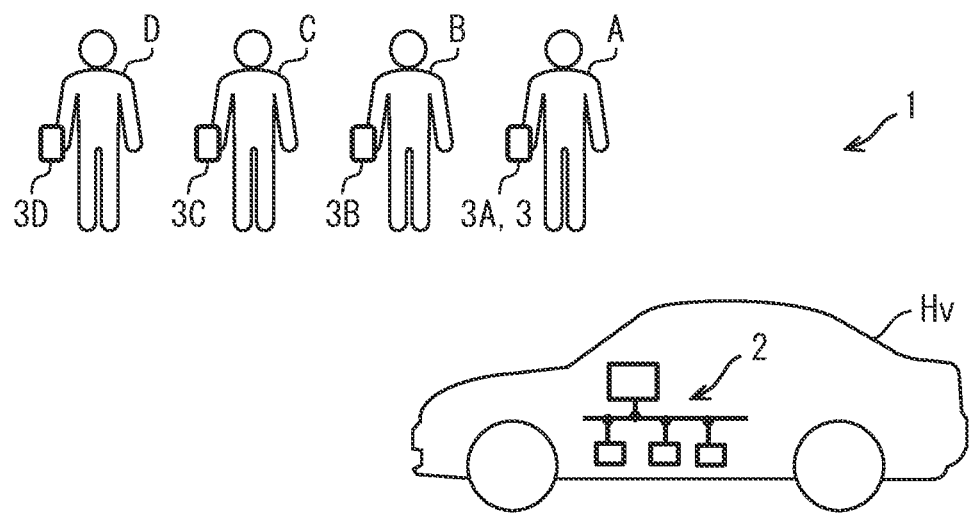
FIG. 1 is a diagram schematically showing an overall configuration of a vehicle electronic key system.

To begin with, examples of relevant techniques will be described. In a comparative example, a vehicle electronic key system unlocks a door of a vehicle based on authentication by wireless communication between an in-vehicle device mounted on the vehicle and a mobile device carried by a user of the vehicle and associated with the in-vehicle device.

In addition, an application example of the vehicle electronic key system is a configuration in which the in-vehicle device acquires identification information about the user from the mobile device, thereby identifying the user who uses the vehicle from now, and automatically changing a driving environment in a vehicle compartment to a driving environment preferred by the user. As a premise, driving environment setting data for each user is pre-registered in the in-vehicle device in association with identification information about the user. The driving environment includes the position of the driver seat, the position of the steering, and the setting of air conditioning.

However, in a case where multiple users each having a mobile device boards the vehicle, it be impossible to identify who is seated on the driver seat among the users.

Further, in order to reduce the power consumption of the mobile device and the in-vehicle device, the vehicle electronic key system may be configured not to search for another mobile device any more when one of the mobile devices is confirmed to be present in a vehicle compartment. In such a configuration, only the user who boards the vehicle first is recognized as an occupant by the system. In addition, even in a case where the user who boards the vehicle first is seated on a seat other than the driver seat, such as an assistant driver seat, the vehicle interior environment around the driver seat may be adjusted to the setting environment of the user. In other words, a user who is not a driver is regarded as a driver.

As an assumed configuration for detecting all the users aboard the vehicle, the search signal may be continuously transmitted in order to detect another mobile device even in a case where a mobile device is confirmed to be present in a vehicle compartment.

However, in the assumed configuration, since the number of the communications increases, the power consumption of the in-vehicle device increases. This can be more remarkable as the number of mobile devices associated with the vehicle is larger. In addition, in the assumed configuration, although a fact that multiple users are aboard the vehicle and the number of the users can be identified, a seating position for each user, such as who is the driver and who is the occupant on the assistant driver seat, cannot be identified.

In contrast to the comparative example, a seating position determination system and a vehicle controller according to the present disclosure can identify a seating position of each user who boards a vehicle while reducing power consumption.

According to at least one embodiment of the present disclosure, a seating position determination system determines a seating position of each of users boarding a vehicle based on a receiving situation of wireless signals from mobile devices carried by the users. The seating position determination system includes vehicle exterior communicators, at least one vehicle interior communicator and a controller. The vehicle exterior communicators are disposed at an outer face portion of the vehicle and configured to wirelessly communicate with the mobile devices. The at least one vehicle interior communicator is disposed in a vehicle compartment of the vehicle and configured to wirelessly communicate with the mobile devices. The controller is configured to control operations of the vehicle exterior communicators and the at least one vehicle interior communicator. The controller includes a mobile device detection unit, a vehicle state acquisition unit, an entry determination unit and a seating position determination unit. The mobile device detection unit is configured to, based on a communication result between the vehicle exterior communicators and the mobile devices, detect a target device that is a mobile device positioned outside the vehicle compartment and within a predetermined distance from a door of the vehicle among the mobile devices, and identify a position of the target device outside the vehicle compartment. The vehicle state acquisition unit is configured to acquire a boarding signal from a predetermined in-vehicle sensor. The boarding signal indicates a possibility that any of the users has boarded the vehicle. The entry determination unit is configured to determine whether the target device has entered the vehicle compartment by causing the at least one vehicle interior communicator to communicate with the target device based on the vehicle state acquisition unit acquiring the boarding signal. The seating position determination unit is configured to determine that a target seat is a seating position of a user corresponding to the target device based on the entry determination unit determining the target device to be present in the vehicle compartment. The target seat is a seat of the vehicle corresponding to the position of the target device identified outside the vehicle compartment by the mobile device detection unit.

According to the above configuration, the seating position of the user holding the mobile device is determined according to the position of the mobile device immediately before boarding. For example, in a case where the position of the mobile device before riding is near the door of the assistant driver seat, the seating position of the user associated with the mobile device is determined to be the assistant driver seat. According to such a configuration, the seating position of each user can be identified, in other words, the seated person of each seat can be identified. In the above configuration, acquisition of the boarding signal by the vehicle state acquisition unit triggers a search in the vehicle compartment for the mobile device that has been detected to be present outside the vehicle compartment before the acquisition of the boarding signal. The mobile device that has not been detected to be present outside the vehicle compartment before acquisition of the boarding signal can be excluded from a target to be searched for in the vehicle compartment immediately after acquisition of the boarding signal, so that power consumption in the controller corresponding to the in-vehicle device can be reduced.

According to at least one embodiment of the present disclosure, a vehicle controller determines a seating position of each of users of a vehicle based on a receiving situation of a wireless signal from each of mobile devices carried by the users. The vehicle controller includes an in-vehicle communication unit, a mobile device detection unit, a vehicle state acquisition unit and a seating position determination unit. The in-vehicle communication unit is configured to communicate with vehicle exterior communicators and at least one vehicle interior communicator. The vehicle exterior communicators are disposed at an outer face portion of the vehicle and configured to wirelessly communicate with the mobile devices. The at least one vehicle interior communicator is disposed in a vehicle compartment of the vehicle and configured to wirelessly communicate with the mobile devices. The mobile device detection unit is configured to, based on a communication result between the vehicle exterior communicators and the mobile devices, detect a target device and identify a position of the target device outside the vehicle compartment. The target device is a mobile device positioned outside the vehicle compartment and within a predetermined distance from a door of the vehicle among the mobile devices. The vehicle state acquisition unit is configured to acquire a boarding signal from a predetermined in-vehicle sensor. The boarding signal indicates a possibility that any of the users has boarded the vehicle. The entry determination unit is configured to determine whether the target device has entered the vehicle compartment by causing the at least one vehicle interior communicator to communicate with the target device based on the vehicle state acquisition unit acquiring the boarding signal. The seating position determination unit is configured to determine that a target seat is a seating position of a user corresponding to the target device based on the entry determination unit determining the target device to be present in the vehicle compartment. The target seat is a seat of the vehicle corresponding to the position of the target device identified outside the vehicle compartment by the mobile device detection unit.

The above-described vehicle controller has technical features similar to those of the controller of the above-described seating position determination system. Therefore, the same effects as those of the seating position determination system described above are obtained.

Hereinafter, multiple embodiments for implementing the present disclosure will be described referring to drawings. Among the embodiments, parts that correspond to each other may be assigned the same reference numeral, and redundant explanation for the part may be omitted. When only a part of a configuration is described in an embodiment, explanations of the other parts of the configuration described in another preceding embodiment may be used. Parts may be combined among the embodiments even if it is not explicitly described that the parts can be combined. The embodiments may be partially combined even if it is not explicitly described that the embodiments can be combined, provided there is no harm in the combination.

Hereinafter, an embodiment of the present disclosure will be described with reference to the drawings. FIG. 1 is a conceptual diagram for describing an outline of a vehicle electronic key system 1 to which a seating position determination system according to the present disclosure is applied. As illustrated in FIG. 1, the vehicle electronic key system 1 includes an in-vehicle system 2 mounted on a vehicle Hv used by a plurality of users, and smart keys 3A to 3D carried by the plurality of users A to D, respectively.

Here, the user is a person registered in the in-vehicle system 2 in advance as a user of the vehicle Hv. Here, as an example, it is assumed that four users A to D are registered. Each of the smart keys 3A to 3D is a mobile device that is associated with the in-vehicle system 2 and functions as a key (actually, an electronic key) of the vehicle Hv. The smart keys 3A to 3D correspond to the users A to D, respectively. For example, the smart key 3D is a mobile device owned by the user D. When the smart keys 3A to 3D are not distinguished from each other, the smart keys 3A to 3D are also simply referred to as the smart key 3. The number of smart keys 3 associated with the in-vehicle system 2 is not limited to four. The number of smart keys 3 may be two, three, or five or more.

The in-vehicle system 2 and the plurality of smart keys 3 each have a configuration for performing wireless communication using radio waves in a predetermined frequency band. Specifically, the in-vehicle system 2 has a function of transmitting a signal of a predetermined frequency belonging to a low frequency (LF) band and a function of receiving a signal of an ultra high frequency (UHF) band transmitted from the smart key 3. In the vehicle Hv, the transmission range of the signal in the LF band is limited to a predetermined range in the vehicle compartment and around the vehicle. The smart key 3 has a function of receiving an LF band signal transmitted from the in-vehicle system 2 and a function of returning a signal of a predetermined frequency belonging to the UHF band to the in-vehicle system 2. Note that the LF band here refers to a frequency band of 300 kHz or less, and includes frequencies such as 20 kHz to 30 kHz. The UHF band refers to 300 MHz to 3 GHz.

The frequency of the LF band used for signal transmission from the in-vehicle system 2 to the smart key 3 in the vehicle electronic key system 1 is, for example, 125 kHz or 134 kHz. The frequency in the UHF band used for signal transmission from the smart key 3 to the in-vehicle system 2 is, for example, 315 MHz or 920 MHz. Here, as an example, it is assumed that 125 kHz is used as a frequency used for signal transmission from the in-vehicle system 2 to the smart key 3. In addition, it is assumed that 315 MHz is used as a frequency used for signal transmission from the smart key 3 to the in-vehicle system 2. Note that, here, as an example, an aspect is disclosed in which the in-vehicle system 2 and the smart key 3 perform bidirectional wireless communication using radio waves in the LF band and the UHF band, but the frequency for performing wireless communication between the in-vehicle system 2 and the smart key 3 can be appropriately changed.

The in-vehicle system 2 wirelessly communicates with the smart key 3 to authenticate the smart key 3. In addition, the in-vehicle system 2 performs predetermined vehicle control for the user to use the vehicle Hv based on the successful authentication of the smart key 3. The vehicle control for the user to use the vehicle Hv includes locking and unlocking of doors, starting of an engine, and the like. The authentication of the smart key 3 by the in-vehicle system 2 may be performed by, for example, a challenge-response method. Since the authentication process involves a process of verifying the code generated by the smart key 3 with the code held or generated by the vehicle Hv, the authentication process can also be referred to as a verification process. Details of the authentication process will be separately described later. Successful authentication of the smart key 3 corresponds to determination of the proper smart key 3.

As preparation for the authentication process, an encryption key used for the authentication process is stored in each of the smart key 3 and the in-vehicle system 2. The encryption key may be different for each smart key 3. A unique identification number (hereinafter, the key ID) is allocated to the smart key 3, and the key ID is registered in the in-vehicle system 2. The key ID is different for each smart key 3. Note that the above-described encryption key may be a key ID or may be prepared separately from the key ID. For example, the key ID is expressed by several bits such as first to fourth, and the encryption key may be a bit string having a length of 5 bits or more. The key ID and the encryption key correspond to identification information about the smart key 3. In addition, a response code to be described later generated using the encryption key can also be included in the identification information.

In addition, the in-vehicle system 2 performs wireless communication with the smart key 3 to identify the seating position of each user. Then, when the seating position of the user is identified, the setting of the vehicle interior environment such as the seat position is automatically changed to the vehicle interior environment according to the preference of the user with reference to the vehicle setting data corresponding to the user. For example, in a case where it is determined that the seating position of the user B is the driver seat, the setting environment of the user B is applied to the environment around the driver seat such as the seat position of the driver seat and the steering wheel height. Further, for example, when the seating position of the user A is determined to be the assistant driver seat, the setting of the user A is applied to the vehicle facility that constructs the environment around the assistant driver seat, such as the seat position of the assistant driver seat and the temperature and the wind direction of the air-conditioned air blown out from the air outlet for the assistant driver seat.

Note that determining that the seating position of a certain user is the driver seat corresponds to determining that the user is a user who plays a role as a driver in this trip. The trip here refers to a series of traveling from when the vehicle Hv starts traveling to when the vehicle Hv is parked. Determination of the seating position for each user corresponds to determination of an attribute as an occupant (hereinafter, the occupant attribute). Specifically, the occupant attribute corresponds to a seating position such as whether the occupant is in the driver seat, the occupant is in the assistant driver seat, or the occupant is in the rear seat. In addition, determining the seating position for each user corresponds to determining the seated person for each seat. Here, a seated person on a certain seat corresponds to a user who uses the seat, in other words, a user who is seated on/scheduled to be seated on the seat.

Hereinafter, a specific configuration and operation of respective elements will be described. In the present embodiment, the vehicle Hv is an engine vehicle as an example, but the vehicle Hv may be a hybrid vehicle or an electric vehicle. An engine vehicle herein refers to a vehicle including only an engine as a power source, and a hybrid vehicle refers to a vehicle including an engine and a motor as a power source. Engine vehicles also include diesel vehicles. An electric vehicle refers to a vehicle including only a motor as a driving source. As an example, the vehicle Hv is a vehicle provided with a driver seat on the right side, but the vehicle Hv may be a vehicle provided with a driver seat on the left side. The vehicle Hv may be a so-called owner car owned by an individual, or may be a vehicle used in a car-sharing service. In addition, the vehicle may be a rental car or a company vehicle owned by a company organization.

<Configuration of Smart Key 3>

Figure 2:
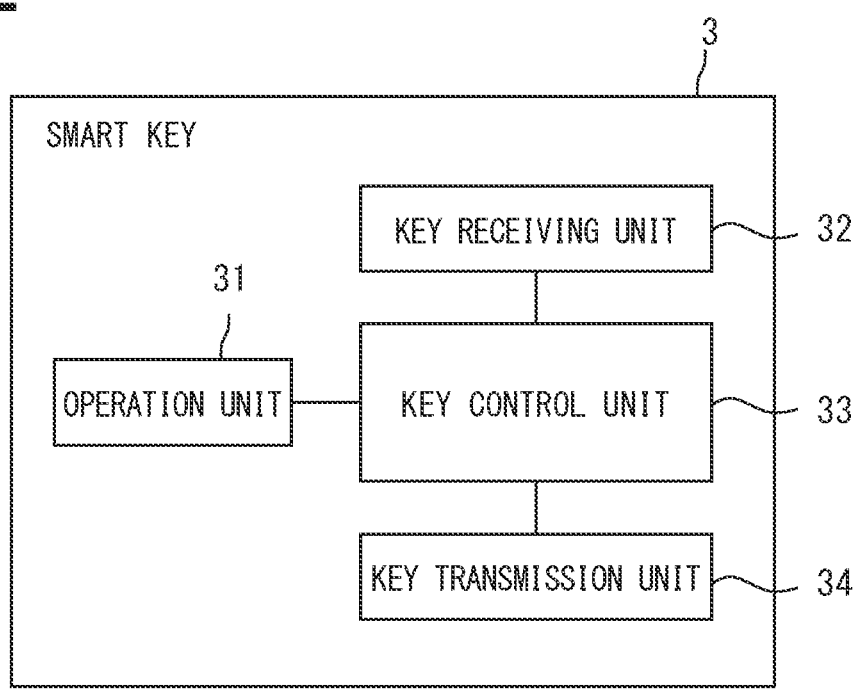
FIG. 2 is a block diagram illustrating a configuration of a smart key.

First, the configuration of the smart key 3 will be described. As illustrated in FIG. 2, the smart key 3 includes an operation unit 31, a key receiving unit 32, a key control unit 33, and a key transmission unit 34. The key control unit 33 is communicably connected to each of the key receiving unit 32 and the key transmission unit 34.

The operation unit 31 is configured to receive a user operation on the smart key 3. The operation unit 31 is, for example, a push switch. For example, the user can use a remote keyless entry function of unlocking/locking the doors of the vehicle Hv by pressing a switch as the operation unit 31. The operation unit 31 may include a plurality of switches. For example, the operation unit 31 may include a locking switch that is a switch for locking the doors of the vehicle Hv and an unlocking switch that is a switch for unlocking the doors of the vehicle Hv. Note that the operation unit 31 may be realized by a combination of a display and a touch panel. The smart key 3 wirelessly transmits a remote control signal corresponding to a switch operated by a user to the smart ECU 4 to provide a so-called remote keyless entry system configured to perform control such as locking/unlocking of vehicle doors.

The key receiving unit 32 is configured to receive a wireless signal (hereinafter, the LF signal) of a predetermined frequency (here, 125 kHz) belonging to the LF band transmitted from the in-vehicle system 2. The key receiving unit 32 is implemented by using an antenna for receiving an LF signal and a circuit (so-called demodulation circuit) for demodulating a received signal. The key receiving unit 32 extracts data included in the received signal by performing predetermined processing such as analog-digital conversion, demodulation, and decoding on the signal received by the antenna. Then, the extracted data is provided to the key control unit 33.

When a received signal is input from the key receiving unit 32, the key control unit 33 generates a baseband signal corresponding to a response signal corresponding to the received signal to output the baseband signal to the key transmission unit 34. For example, when the key receiving unit 32 receives the response request signal transmitted from the in-vehicle system 2, the key control unit 33 generates a baseband signal as a response signal corresponding to the content of the received response request signal to output the baseband signal to the key transmission unit 34. The baseband signal as the response signal is subjected to predetermined modulation processing by the key transmission unit 34 and transmitted as a wireless signal.

When receiving a response request signal including a challenge code to be described later transmitted from the in-vehicle system 2, the key control unit 33 generates a baseband signal including a response code generated using an encryption key registered in advance in the smart key 3. A baseband signal (so-called response signal) including the response code generated by the key control unit 33 is output to the key transmission unit 34 and transmitted as a wireless signal.

The key control unit 33 may be realized using a computer including a central processing unit (CPU), a random access memory (RAM), a read only memory (ROM), and the like. The key control unit 33 may be realized by using one or a plurality of ICs, FPGAs, or the like.

The key transmission unit 34 is configured to transmit a wireless signal of a predetermined frequency (315 MHz in this case) belonging to the UHF band to the in-vehicle system 2 by the smart key 3. The key transmission unit 34 converts a signal obtained by performing modulation, frequency conversion, or the like on the baseband signal input from the key control unit 33 into a radio wave and emits the radio wave into space. The key transmission unit 34 is implemented using an antenna or a modulation circuit. The wireless signal transmitted by the key transmission unit 34 is also referred to as an RF signal. RF is an abbreviation for radio frequency.

As an external shape of the smart key 3, various shapes such as a flat rectangular parallelepiped shape, a flat elliptical shape (so-called fob type), and a card shape can be used. The smart key 3 may be any device that is carried by the user and has a function as an electronic key of the vehicle Hv. Specifically, the function as an electronic key of the vehicle Hv is a function of returning information (for example, a response code) that certifies the key of the vehicle Hv based on a request from the in-vehicle system 2. The response signal may include a key ID as transmission source information in addition to the response code. However, in a case where the key ID is used to generate the response code, the response code itself can function as identification information about the smart key 3 as a transmission source. Therefore, in a case where the key ID is used as the encryption key for generating the response code, the response signal does not need to include the key ID separately from the response code. The smart key 3 may be configured to be able to transmit a signal including identification information that allows the smart ECU 4 to identify a transmission source, such as a key ID and a response code.

Note that the smart key 3 may be an information processing terminal such as a smartphone or a tablet terminal. In addition, the smart key 3 may be configured as a wearable device worn on a finger, an arm, or the like of the user. The smart key 3 corresponds to a mobile device.

<Configuration of In-Vehicle System 2>

Figure 3:
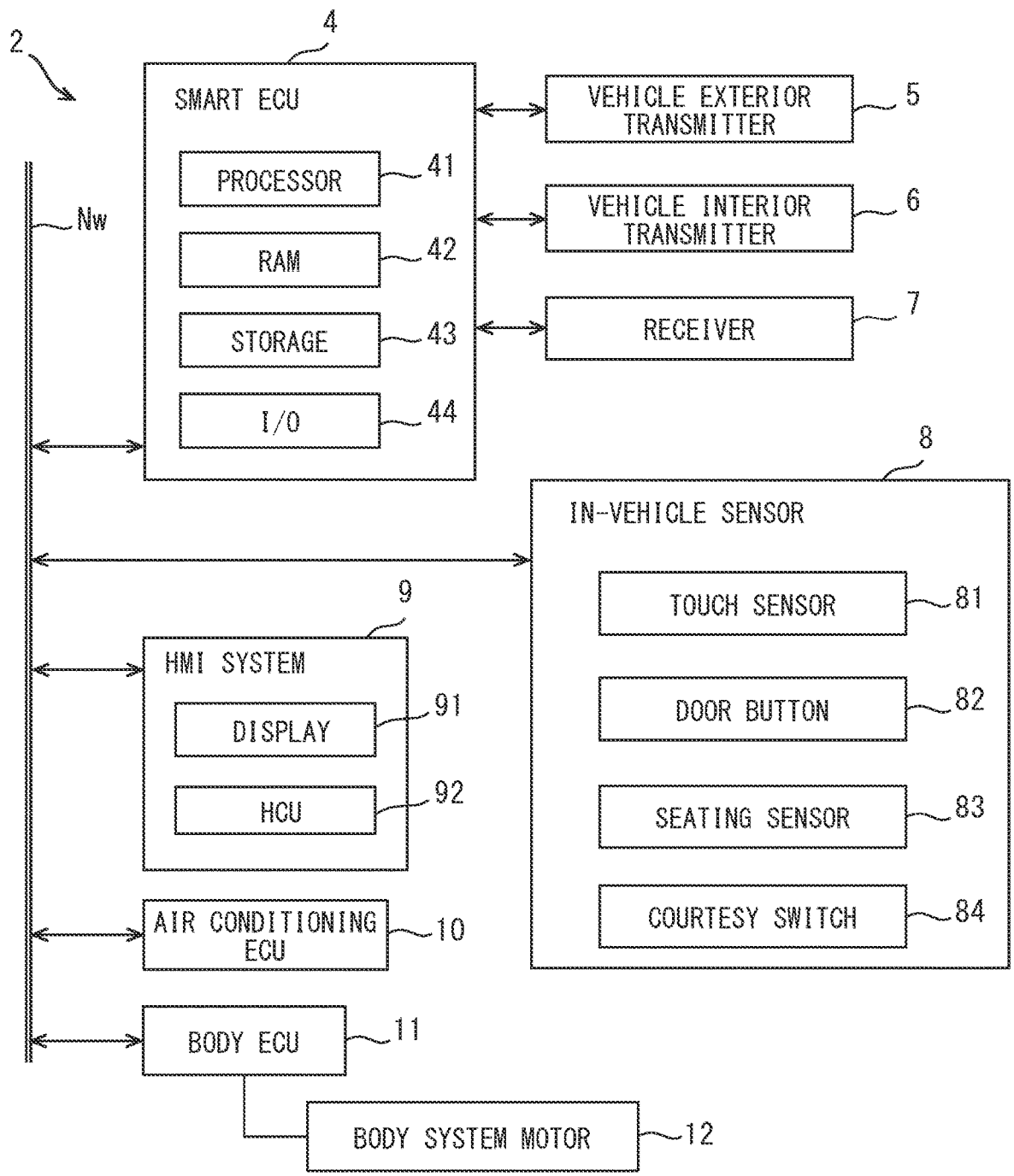
FIG. 3 is a block diagram illustrating a configuration of an in-vehicle system.

Next, a configuration of the in-vehicle system 2 will be described. As illustrated in FIG. 3, the in-vehicle system 2 includes a smart ECU 4, a vehicle exterior transmitter 5, a vehicle interior transmitter 6, a receiver 7, an in-vehicle sensor 8, an HMI system 9, an air conditioning ECU 10, a body ECU 11, and a body system motor 12. The in-vehicle sensor 8 is a sensor configured to detect the state of the vehicle Hv, and includes, for example, a touch sensor 81, a door button 82, a seating sensor 83, a courtesy switch 84, and the like. The HMI system 9 is a system that presents information to a user, and includes a display 91 and an HCU 92. The ECU in the member name is an abbreviation for electronic control unit, and refers to an electronic controller. HMI is an abbreviation for human machine interface, and HCU is an abbreviation for HMI control unit.

The smart ECU 4 is connected to each of the vehicle exterior transmitter 5, the vehicle interior transmitter 6, and the receiver 7 via a dedicated signal line. The smart ECU 4 is communicably connected to the HMI system 9, the air conditioning ECU 10, the body ECU 11, and the like via an in-vehicle network Nw which is a communication network constructed in the vehicle Hv. Some or all of the vehicle exterior transmitter 5, the vehicle interior transmitter 6, and the receiver 7 may be configured to communicate with the smart ECU 4 via the in-vehicle network Nw. In addition, the body ECU 11 and the like may be connected to the smart ECU 4 via an exclusive line without the in-vehicle network Nw. The connection form between the devices can be changed as appropriate. The receiver 7 may be built in the smart ECU 4.

The smart ECU 4 is an ECU that wirelessly communicates with the smart key 3 to control a locked state or the like of the vehicle Hv and determines a seating position of each user who boards the vehicle Hv. The smart ECU 4 corresponds to a vehicle controller. The smart ECU 4 is configured as a computer including a processor 41, a RAM 42, a storage 43, a communication interface 44 (I/O in the figure), a bus line connecting these components, and the like. The processor 41 is, for example, an arithmetic core such as a CPU. The processor 41 executes various processes by accessing the RAM 42. The RAM 42 is a volatile memory.

The storage 43 includes a nonvolatile storage medium such as a flash memory. The storage 43 stores a control program for causing the computer to function as the smart ECU 4. Execution of the control program by the processor 41 corresponds to execution of the seating position determination method corresponding to the control program. The communication interface 44 is a circuit for the smart ECU 4 to communicate with other devices. The communication interface 44 may be realized by using an analog circuit element, an IC, or the like. Details of the function, provided by the smart ECU 4, expressed by the processor 41 executing the vehicle control program will be described later. The communication interface 44 corresponds to an in-vehicle communication unit.

In addition, the storage 43 stores vehicle setting data for each user of the vehicle Hv and the key ID of the smart key 3 held by each user in association with each other. The vehicle setting data corresponds to a data set indicating user's setting values for various items constituting the vehicle interior environment, such as a seat position and an air conditioning temperature.

Examples of the personal setting item that can be set by the user include a seat position, a steering wheel position, an angle of a rearview mirror, an angle of a sideview mirror, and an operation setting of an air conditioner. The seat position here can include not only the front and rear position but also a position in the height direction, a reclining angle, and the like. Setting of the seat position can also be referred to as seat setting. The steering wheel position includes an angle and a front and rear position of the steering wheel. The operation setting of air conditioning includes temperature, air volume, wind direction, and the like. In addition, in a case where the vehicle Hv has a welcome illumination function of turning on the lights provided inside and outside the vehicle compartment triggered by the user's unlocking operation, the color of the lighting can also be included in the personal setting item.

Further, a setting value for a user interface (hereinafter, UI: User Interface) of the HMI system 9 can also be included in the vehicle setting data for each user. Examples of the screen included in the HMI system 9 include a meter screen and a navigation screen. For example, an icon shape of a navigation screen, a display item, a language, and the like may be included in the personal setting item. In addition, the display content of the welcome screen displayed on the meter display or the like when the traveling power source is turned on can also be included in the personal setting item. The traveling power source is a power source for the vehicle Hv to travel, and refers to an ignition power source when the vehicle Hv is a gasoline vehicle. In a case where the vehicle Hv is an electric vehicle or a hybrid vehicle, the traveling power source refers to a system main relay.

Furthermore, in a case where the vehicle Hv has an adaptive cruise control (ACC) function, a target speed, a target inter-vehicle distance (longer/shorter), and the like can be included in the personal setting items. Note that the ACC function indicates a function of causing the vehicle Hv to travel at a constant speed at a target speed designated by the user, or causing the vehicle Hv as the host vehicle to perform following traveling while maintaining an inter-vehicle distance from the preceding vehicle. In addition, in a case where the vehicle Hv has a road sign assist (RSA) function of displaying an image of a traffic sign recognized by the front camera on a meter display or an HUD, a display mode of the traffic sign image can be included in the personal setting item. As components of the display mode of the image, a display position, a display size, a color, a length of a display time, flickering, a speed of fade-in/fade-out, a display as a display destination, and the like can be used. In addition, for example, a threshold value related to a timing for warning collision with an external object based on time to collision (TTC) or the like can also be included in the personal setting item.

Each of the vehicle exterior transmitter 5 and the vehicle interior transmitter 6 is a device that converts a carrier signal input from the smart ECU 4 into a radio wave having a predetermined frequency belonging to the LF band and radiates the radio wave into space. For convenience, the vehicle exterior transmitter 5 and the vehicle interior transmitter 6 are also referred to as LF transmitters when they are not distinguished from each other.

The vehicle exterior transmitter 5 is an LF transmitter for setting a predetermined area outside the vehicle compartment as a response area. The response area here corresponds to a range in which the smart key 3 returns a response signal to the LF signal transmitted from the LF transmitter. For example, the response area can be a range in which the LF signal transmitted by the in-vehicle system 2 propagates while maintaining a predetermined signal intensity (hereinafter, the response threshold value). The response threshold value corresponds to the signal intensity of the LF signal that defines the size of the response area. The response threshold value may be, for example, a lower limit value (that is, a demodulation limit value) of the signal level that can be demodulated by the smart key 3, or may be a predetermined value larger than the demodulation limit value. The response threshold value may be appropriately adjusted by a designer so as to form a desired response area. Even when the smart key 3 receives a signal from the in-vehicle system 2, the smart key 3 may be configured to determine that the smart key 3 is outside the response area and not to return a response when the received signal strength is equal to or less than the response threshold value. The size and shape of the response area formed by each LF transmitter may be appropriately designed. The size of the response area formed by each LF transmitter can be adjusted by a response threshold value, transmission power at the LF transmitter, receiving sensitivity at the smart key 3, and the like. The response area can be understood as an area (thereafter, communication area) in which the vehicle Hv and the smart key 3 can perform bidirectional communication.

Figure 4:
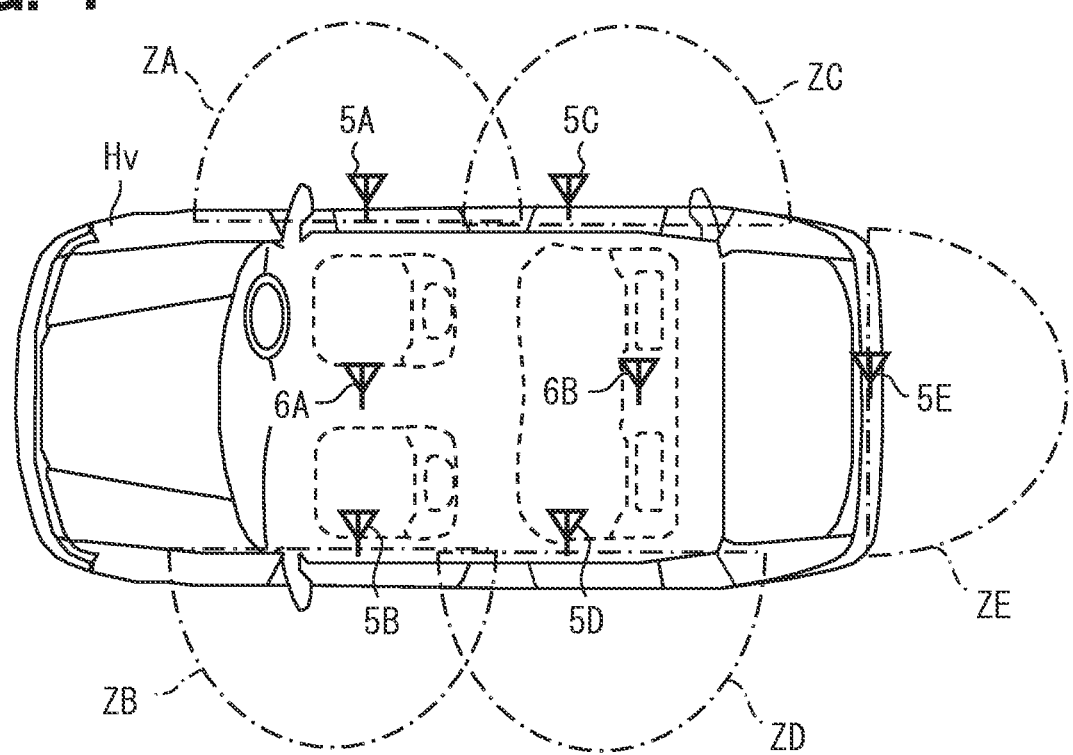
FIG. 4 is a conceptual diagram illustrating an example of an installation position of an LF transmitter and a communication area of the LF transmitter.

As illustrated in FIG. 4, the in-vehicle system 2 according to the present embodiment includes, as the vehicle exterior transmitter 5, a DF transmitter 5A, a PF transmitter 5B, a DR transmitter 5C, a PR transmitter 5D, and a trunk transmitter 5E. The first character "D" in the member name of the vehicle exterior transmitter 5 indicates that the member is on the driver seat side, and "P" indicates that the member is on the assistant driver seat side. The second letter "F" in the member name of the vehicle exterior transmitter 5 indicates a front seat, and "R" indicates a rear seat. Thus, for example, "DF" means for the front seat on the driver seat side (that is, the driver seat). In the present embodiment, the driver seat side of the vehicle Hv corresponds to the right side of the vehicle.

The DF transmitter 5A is an LF transmitter provided on an outer door handle for a driver seat. Here, the outer door handle refers to a grip member provided on an outer face portion of the door for opening and closing the door. The DF transmitter 5A is designed such that a response area is, for example, within one m from an outer door handle for a driver seat. ZA in the figure conceptually represents a response area provided by the DF transmitter 5A. The PF transmitter 5B is an LF transmitter provided on an outer door handle for an assistant driver seat. The PF transmitter 5B is designed such that an area within one m from the outer door handle for the assistant driver seat outside the vehicle compartment is a response area. ZB in the figure conceptually represents a response area provided by the PF transmitter 5B.

The DR transmitter 5C is an LF transmitter provided on an outer door handle for a rear seat on the driver seat side. DR transmitter 5C is designed such that a response area is, for example, within one m from an outer door handle for a rear seat on the driver seat side. ZC in the figure conceptually represents a response area provided by the DR transmitter 5C. The PR transmitter 5D is an LF transmitter provided on an outer door handle for a rear seat on the assistant driver seat side. The PR transmitter 5D is designed such that an area within one m from an outer door handle for a rear seat on the assistant driver seat side outside the vehicle compartment is a response area. ZD in the figure conceptually represents a response area provided by the PR transmitter 5D.

The trunk transmitter 5E is an LF transmitter provided on a door handle of the trunk. The trunk transmitter 5E is designed such that a response area is within one m from the trunk door outside the vehicle compartment. ZE in the figure conceptually represents a response area provided by the trunk transmitter 5E.

The various vehicle exterior transmitters 5 may be incorporated in the door handle or may be disposed at a panel portion near the door handle. Each aspect corresponds to a configuration provided on the door handle. The range indicated by the vicinity of a certain member in the description of the installation position of the LF transmitter is, for example, within 0.3 m from the member. The vicinity of the door handle means within 0.3 m from the door handle.

Further, the various vehicle exterior transmitters 5 may be disposed at a portion other than the door handle, such as a pillar such as a B-pillar, a side sill, a roof end, or a window frame. The location where the vehicle exterior transmitter 5 is mounted may be any location on the outer face portion of the vehicle Hv. Here, the outer face portion refers to the left and right side face portions and the back face portion of the vehicle Hv. The radius of the response area of the vehicle exterior transmitter 5 is not limited to one m, and may be 0.75 m or the like. The vehicle exterior transmitter 5 may be configured such that a response area is within six m from the vehicle Hv. The response area of the vehicle exterior transmitter 5 may be dynamically changed according to the state and use of the vehicle Hv. As described above, the size of the response area can be adjusted by the transmission power of the LF signal. Examples of the state of the vehicle Hv include a parked state, a state in which remote parking or automatic parking is performed, and a traveling state.

The vehicle interior transmitter 6 is an LF transmitter disposed in a vehicle compartment such that the vehicle interior is set as a response area. As an example, the in-vehicle system 2 includes a front seat transmitter 6A and a rear seat transmitter 6B as the vehicle interior transmitter 6 as illustrated in FIG. 4. The front seat transmitter 6A is an LF transmitter for setting the entire front seat in the vehicle compartment as a response area. The entire front seat includes the upper side of the dashboard. The installation position of the front seat transmitter 6A can be located at a central portion of the instrument panel in the vehicle width direction, the vicinity of the center console box, the vicinity of the overhead console, the vicinity of the rearview mirror, and the like.

The rear seat transmitter 6B is an LF transmitter for setting the entire rear seat in the vehicle compartment as a response area. Note that the rear seat transmitter 6B is preferably configured to include a space behind the rear seat, such as a luggage room, in the response area. The installation position of the rear seat transmitter 6B can be located at a seat inside located at a center portion of the rear seat in the vehicle width direction, a backrest portion, a ceiling portion located above the rear seat, or the like. In FIG. 4, the response area of the vehicle interior transmitter 6 is not illustrated.

Of course, the number and arrangement of the LF transmitters included in the in-vehicle system 2 can be changed as appropriate. The in-vehicle system 2 may include an LF transmitter with the inside of the trunk as a response area. In addition, one LF transmitter may be provided on each of the left and right side face portions. For example, the DF transmitter 5A and the DR transmitter 5C may be integrated and provided in a B-pillar or the like.

Note that a metal plate such as a door panel is present between the outside of the vehicle compartment and the inside of the vehicle compartment, and the metal plate acts to inhibit propagation of radio waves, so that the response area between the outside of the vehicle compartment and the outside of the vehicle compartment is easily divided. On the other hand, since there is usually no metal plate such as a door panel between the front seat and the rear seat in the vehicle compartment, the response area of the front seat transmitter 6A and the response area of the rear seat transmitter 6B may partially overlap near the boundary. For similar reasons, the response area of the DF transmitter 5A and the response area of the DR transmitter 5C may partially overlap. The response area of the PF transmitter 5B and the response area of the PR transmitter 5D may also partially overlap.

The receiver 7 is a communication module for receiving a response signal transmitted from the smart key 3. The receiver 7 is configured to receive radio waves of a predetermined frequency belonging to the UHF band. The receiver 7 may be referred to as a tuner in the technical field of a vehicle electronic key system. The receiver 7 is realized using an antenna for receiving a wireless signal in the UHF band transmitted from the smart key 3, a demodulation circuit, and the like. The frequency at which the receiver 7 receives the signal may be set to a frequency designed in advance as a frequency to be used for wireless communication with the smart key 3. The frequency used for wireless communication with the smart key 3 may be 920 MHz, 2.4 GHz, or the like. The receiver 7 extracts data included in the received signal by performing predetermined processing such as analog/digital conversion, demodulation, and decoding on the signal received by the UHF antenna. Then, the extracted data is provided to the smart ECU 4. For example, the receiver 7 provides the smart ECU 4 with the key ID and the response code included in the received signal.

The touch sensor 81 is provided on each outer door handle of the vehicle Hv, and detects that the user is touching the door handle. The detection result by each touch sensor 81 is output to the smart ECU 4. Based on the detection signal from the touch sensor 81 of each door, the smart ECU 4 can identify the door handle being touched by the user.

The door button 82 is a button provided on each door, and is provided on, for example, each outer door handle. When the door button 82 is pressed by the user, it outputs an electric signal indicating the fact to the smart ECU 4. By detecting that the door button 82 is pressed, the smart ECU 4 locks or unlocks the door. In a case where the door is a power slide door, the power slide door can also function as a button for switching an open/closed state of the door.

Note that the configuration for receiving the user operation for unlocking the door may be only one of the touch sensor 81 and the door button 82. The role of the touch sensor 81 may be divided into that for unlocking and that for locking the door button 82. In addition, as a sensor configured to detect an operation for switching the locked state of the door by the user, a sonar, an infrared sensor, or the like for detecting that the user holds a foot under the door can also be employed.

The seating sensor 83 is a sensor configured to detect that a person is seated, and is provided for each seat, for example. The seating sensor 83 can be, for example, a pressure sensor embedded in a seating surface of each seat. Note that the seating sensor 83 may be a camera that captures an image of the inside of the vehicle compartment, or may be a millimeter wave radar.

The courtesy switch 84 is a sensor configured to detect opening and closing of a door, and is provided for each door. The courtesy switch 84 outputs a door signal indicating an open/closed state of the door. In addition, examples of the in-vehicle sensor 8 may include a shift position sensor configured to detect a shift position, a seat belt sensor configured to detect a wearing state of a seat belt, a steering wheel grip sensor configured to detect a grip state of a handle, and the like.

The display 91 is a device that displays an image. The display 91 is, for example, a so-called center display provided at the uppermost portion of the central portion of the instrument panel in the vehicle width direction. The display 91 can perform full-color display, and can be realized by using a liquid crystal display, an organic light emitting diode (OLED) display, a plasma display, or the like. The display 91 may be a head-up display that displays a virtual image on part of the windshield in front of the driver seat. Further, the display 91 may be a meter display. Examples of the notification device may include a speaker, a vibrator, an illumination device (for example, an LED), or the like in addition to the display 91.

The HCU 92 is a computer that integrally controls information presentation to the user using the display 91 or the like. The HCU 92 is realized by using, for example, a processor such as a CPU or a GPU, a RAM, a flash memory, and the like. The HCU 92 controls the display screen of the display 91 based on a control signal input from the smart ECU 4 or a signal from an input device (not illustrated) such as a touch panel. For example, the HCU 92 displays, on the display 91, a seat assignment image indicating a recognition state of a seating position of each user based on a request from the smart ECU 4. In addition, the HCU 92 receives, via the input device, a user operation for correcting a system recognition error related to a seated person for each seat to output the result to the smart ECU 4. Note that the medium of information presentation to the user is not limited to the display 91. Information may be presented using a speaker, a vibrator, or the like. The input device here also includes a voice input device. The processing of recognizing the voice input via the microphone or the like may be performed inside the vehicle Hv or may be performed by an external server.

The air conditioning ECU 10 is an ECU configured to control an operation state of an air conditioner mounted on the vehicle Hv. The air conditioning ECU 10 controls the temperature, the air volume, and the wind direction of the air-conditioned air to be blown out from the blowout ports for each of the blowout ports based on an instruction from the smart ECU 4. The operating state of the air conditioner can also be changed by the user via the input device.

The body ECU 11 is an ECU configured to control various body system motors 12 mounted on the vehicle Hv. The body system motor 12 here includes, for example, a door lock motor, a seat motor, a steering position adjustment motor, and the like. The door lock motor is a motor for controlling a state of a lock mechanism which is a mechanism for locking a door, and is provided for each door, for example. The seat motor is a motor that changes a front and rear position, a height, and a reclining angle of a seat. The seat motor is provided in each of a driver seat and an assistant driver seat, for example. The steering position adjustment motor is a motor that adjusts a tilt angle or a front and rear position of the steering.

The body ECU 11 controls various body system motors 12 based on a control signal input from the smart ECU 4. For example, the body ECU 11 outputs a predetermined control signal to a door lock motor provided in each door based on a request from the smart ECU 4, and locks and unlocks each door. Further, for example, by outputting a predetermined drive signal to the seat motor of the driver seat, the front and rear position of the driver seat and the like are changed. Note that the smart ECU 4 may have the function of the body ECU 11. In other words, the body ECU 11 may be integrated with the smart ECU 4.

<Function of Smart ECU 4>

Figure 5:
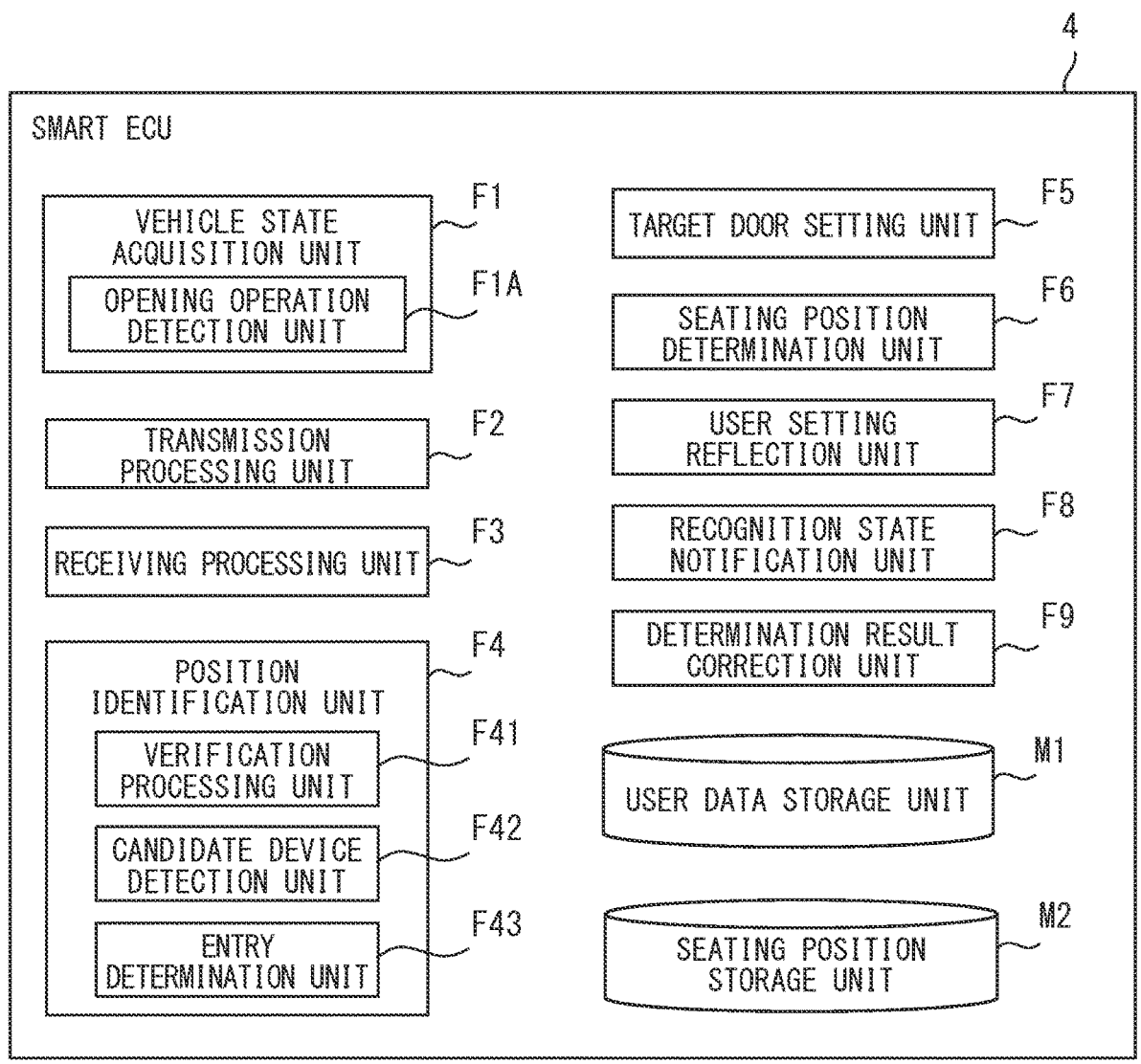
FIG. 5 is a functional block diagram illustrating a configuration of a smart ECU.

The smart ECU 4 includes function units illustrated in FIG. 5 as functional blocks realized by the processor 41 executing a vehicle control program stored in the storage 43. That is, the smart ECU 4 includes a vehicle state acquisition unit F1, a transmission processing unit F2, a receiving processing unit F3, a position identification unit F4, a target door setting unit F5, a seating position determination unit F6, a user setting reflection unit F7, a recognition state notification unit F8, and a determination result correction unit F9. The smart ECU 4 includes a user data storage unit M1 and a seating position storage unit M2.

The user data storage unit M1 is a storage device configured to store vehicle setting data for each user with respect to the vehicle Hv and a key ID of the smart key 3 held by each user in association with each other. In a case where an ID is assigned to each user, the user ID is also stored in association with the key ID and the vehicle setting data. Data such as age, height, and gender may be associated with the user ID. The user data storage unit M1 is realized by using, for example, part of the storage area of the storage 43. Note that the user data storage unit M1 may be on a cloud such as an external server. The user data storage unit M1 corresponds to a user setting storage unit.

The seating position storage unit M2 is configured to store data indicating a correspondence relationship between the user and the seating position identified in the seating position determination process to be described later. The seating position storage unit M2 is realized by using, for example, a storage medium such as the RAM 42. Since the seating position for each user can change for each trip, the seating position storage unit M2 can be realized using a temporary storage medium. Of course, the seating position storage unit M2 may be realized using a nonvolatile memory such as the storage 43.

The vehicle state acquisition unit F1 acquires various types of information (that is, vehicle information) indicating the state of the vehicle Hv from an in-vehicle sensor or another ECU. For example, an open/closed state of a door, a locked state of each door, whether the door button 82 is pressed, and the like corresponds to the vehicle information. Of course, the types of information included in the vehicle information are not limited to those described above. The vehicle information can also include a shift position detected by the shift position sensor, whether the brake pedal is depressed, an operation state of the parking brake, and the like.

The vehicle state acquisition unit F1 includes an opening operation detection unit F1A as a sub-function. The opening operation detection unit F1A is configured to detect that an opening operation, which is a user's operation for opening a vehicle door, has been performed based on output signals of the touch sensor 81 and the door button 82. The opening operation can include an operation for unlocking in addition to an operation for actually opening the door. The opening operation includes an operation of pressing the door button 82, an operation of placing a hand on a door handle, and the like. In addition, the opening operation detection unit F1A may determine that the opening operation has been performed based on input of a signal indicating that the door has been opened from the courtesy switch 84. Determining that a certain operation has been performed corresponds to detecting that the operation has been performed.

The vehicle Hv may be configured to receive a door open instruction by a predetermined voice command. In this case, the utterance of the voice command may also be included in the opening operation. For example, the opening operation detection unit F1A may detect the opening operation by performing a voice recognition process on a voice signal of the user acquired by a microphone for collecting sounds outside the vehicle compartment. In addition, the opening operation detection unit F1A may be configured to detect the opening operation based on an output signal of an infrared sensor forming a detection area under the door. Specifically, when a signal indicating that the user holds the foot over the detection area is input from the infrared sensor, the opening operation detection unit F1A may determine that the user has instructed to open the door. The touch sensor 81, the door button 82, the microphone disposed at the outer face portion of the vehicle Hv, the infrared sensor forming the detection area under the door, and the like correspond to in-vehicle sensors that output a signal serving as a material for determining whether the opening operation has been performed.

In addition, the vehicle state acquisition unit F1 identifies the current state of the vehicle Hv based on the above-described various types of information. For example, when the traveling power source is off and all the doors are locked, the vehicle state acquisition unit F1 determines that the vehicle Hv is parked. Of course, the condition for determining that the vehicle Hv is parked may be appropriately designed, and various determination conditions can be applied.

The transmission processing unit F2 is configured to generate a baseband signal to be transmitted from the LF transmitter based on a request from the position identification unit F4 to output the baseband signal to the LF transmitter. The output destination of the generated baseband signal can be designated by the position identification unit F4. The baseband signal output from the transmission processing unit F2 is converted into an LF signal by the LF transmitter and wirelessly transmitted. Examples of the type of the signal transmitted from the LF transmitter include a polling signal and a challenge signal. Both the challenge signal and the polling signal correspond to a response request signal that is a signal requesting the smart key 3 to return a response signal corresponding to the content of the signal.

Here, the challenge signal is a response request signal including a challenge code. The challenge code is a code for authenticating the smart key 3. The challenge code may be a random number generated using a random number table or the like. In addition, the challenge signal may be a signal that includes a key ID as a destination and responds only to the specific smart key 3. The challenge signal can be understood as a signal requesting the designated smart key 3 to return a response code obtained by encrypting the challenge code with a unique encryption key for each smart key 3. Note that the authentication process may be performed in a mode in which authentication is advanced stepwise by sequentially transmitting a plurality of types of challenge signals having different security levels.

The polling signal may be any signal that requests the smart key 3 to respond. The polling signal can be a signal including information indicating a transmission source, such as a vehicle ID. The polling signal can be, for example, an LF signal that restores the smart key 3 from the sleep mode and returns a signal indicating a certain bit string to the smart key 3. The polling signal may be a signal that does not include a challenge code. Here, as an example, the polling signal is a signal for causing all the smart keys 3 to respond. Of course, as in the challenge signal, the polling signal may be configured to cause only the smart key 3 designated using the key ID or the like to respond. The smart ECU 4 may be configured to sequentially transmit the challenge signal from each of the vehicle exterior transmitters 5 as a polling signal.

The receiving processing unit F3 is configured to acquire data received by a UHF antenna 121 and demodulated by a UHF reception unit 120. The data received by the receiving processing unit F3 is supplied to the position identification unit F4.

The position identification unit F4 is configured to determine the position of the smart key 3 with respect to the vehicle Hv based on the received result of the response signal in the receiver 7 to the challenge signal transmitted from an any LF transmitter. That is, the position identification unit F4 corresponds to a configuration configured to determine the key position based on the communication status between the in-vehicle communicator and the smart key 3. The position determination based on the communication status/communication result with the smart key 3 is performed in cooperation with the transmission processing unit F2 and the receiving processing unit F3. Since the smart key 3 and the user have a one-to-one relationship, identifying the position of the smart key 3 corresponds to identifying the position of the user. The position identification unit F4 corresponds to a mobile device detection unit.

The position identification unit F4 includes a verification processing unit F41, a candidate device detection unit F42, and an entry determination unit F43 as finer functional blocks. The verification processing unit F41 is configured to perform verification processing by wireless communication with the smart key 3 using the challenge code. The verification processing unit F41 causes the challenge signal to be transmitted, for example, when a response signal to the polling signal is received or when the vehicle state acquisition unit F1 detects a predetermined verification event. For convenience, the verification process performed by transmitting the challenge signal from the vehicle exterior transmitter 5, that is, the verification process using the vehicle exterior transmitter 5 is hereinafter also referred to as a vehicle exterior verification. Similarly, the verification process performed by transmitting the challenge signal from the vehicle interior transmitter 6, that is, the verification process using the vehicle interior transmitter 6 is also referred to as a vehicle interior verification.

In addition, when a challenge code for which a certain smart key 3 is to be determined is generated, the verification processing unit F41 generates a verification code using an encryption key of the smart key 3. When the response code returned from the smart key 3 matches the verification code, the verification processing unit F41 determines that the communication counterpart is the authorized smart key 3 (that is, the authentication succeeds). Note that the case where the verification of a certain smart key 3 is considered to have failed is, for example, a case where the code does not match the verification code generated by the verification processing unit F41, a case where the response code cannot be received even after a predetermined response standby time has elapsed since the challenge signal was transmitted, or the like.

The candidate device detection unit F42 is configured to detect the smart key 3 present within a predetermined distance from the door of the vehicle Hv as an entry candidate key. The entry candidate key corresponds to the smart key 3 that has been confirmed to be present in the response area outside the vehicle compartment. In an aspect, the entry candidate key can be understood as a smart key 3 that has returned a response signal to the polling signal among the plurality of smart keys 3. In another aspect, the entry candidate key can be understood as a smart key 3 authenticated by the vehicle exterior verification among the plurality of smart keys 3. The entry candidate key corresponds to the target device.

The entry determination unit F43 is configured to determine whether the entry candidate key entered the vehicle compartment based on the result of the vehicle interior verification using the vehicle interior transmitter 6 for the entry candidate key. The entry determination unit F43 transmits a challenge signal for the entry candidate key from the vehicle interior transmitter 6 determined according to the target door with, for example, the target door set by the target door setting unit F5 to be described later closed as a trigger. When the vehicle interior verification is successful, it is determined that the entry candidate key entered the vehicle compartment.

The target door setting unit F5 is configured to set the target door based on the position of the entry candidate key outside the vehicle compartment identified by the position identification unit F4 or the detection result by the opening operation detection unit F1A. Details of the target door setting unit F5 will be separately described later.

The seating position determination unit F6 identifies the seating position of each user based on the key ID of the entry candidate key and the position of the entry candidate key outside the vehicle compartment. Specifically, the seating position determination unit F6 regards the seat corresponding to the position of the entry candidate key outside the vehicle compartment identified by the position identification unit F4 as the seating position of the user corresponding to the entry candidate key. For example, in a case where the position of the entry candidate key outside the vehicle compartment is the response area of the PF transmitter 5B, it is determined that the seating position of the user corresponding to the entry candidate key is the assistant driver seat.

The user setting reflection unit F7 changes the setting of the vehicle interior environment to an environment according to the preference of the user based on the seating position of the user acquired by the seating position determination unit F6. For example, the user setting reflection unit F7 moves the position of the seat on which the user sits to a position preset by the user. Adjustment of the seat position may be realized in cooperation with body ECU 11. For example, the body ECU 11 drives a seat motor provided in a predetermined seat based on an instruction from the user setting reflection unit F7, and moves the seat position to the target position. The user setting reflection unit F7 corresponds to a personal setting reflection unit.

The recognition state notification unit F8 is configured to notify the occupant of the determination result of the seating position of each user via a notification device such as the display 91. For example, the recognition state notification unit F8 outputs data indicating the determination result of the seating position for each user to the HCU 92, thereby displaying, on the display 91, a sheet assignment image which is an image indicating the determination result. As a result, the user as an occupant can check whether his/her seating position is correctly recognized. In addition, the recognition state notification unit F8 may output, from the speaker, the name or the like of the user determined to be present near the door at the moment when the door is opened or the like. This configuration also allows the user to know how the system recognizes (in other words, determines) the seating position of each user.

The determination result correction unit F9 receives a correction operation for the determination result of the seating position for each user based on the signal from the input device. Then, the determination state of the seating position of each user is corrected based on the correction operation. In addition, the determination result correction unit F9 may correct the determination result by the seating position determination unit F6 based on the detection result by the seating sensor 83. For example, in a state where it is determined by the closing time determination process that the user A is seated on the assistant driver seat, when a signal indicating that the assistant driver seat is vacant is input from the seating sensor 83 even after the assistant driver seat door is closed, the seated person on the assistant driver seat may be corrected to be unknown. The same applies to a rear seat, a driver seat, and the like.

<Seating Position Determination Process>

Here, the seating position determination process performed by the smart ECU 4 will be described. The seating position determination process is a process of identifying a user who uses each seat. The seating position determination process of the present disclosure includes an approaching time determination process illustrated in FIG. 6, an opening time determination process illustrated in FIG. 7, and a closing time determination process illustrated in FIG. 8.

Figure 6:
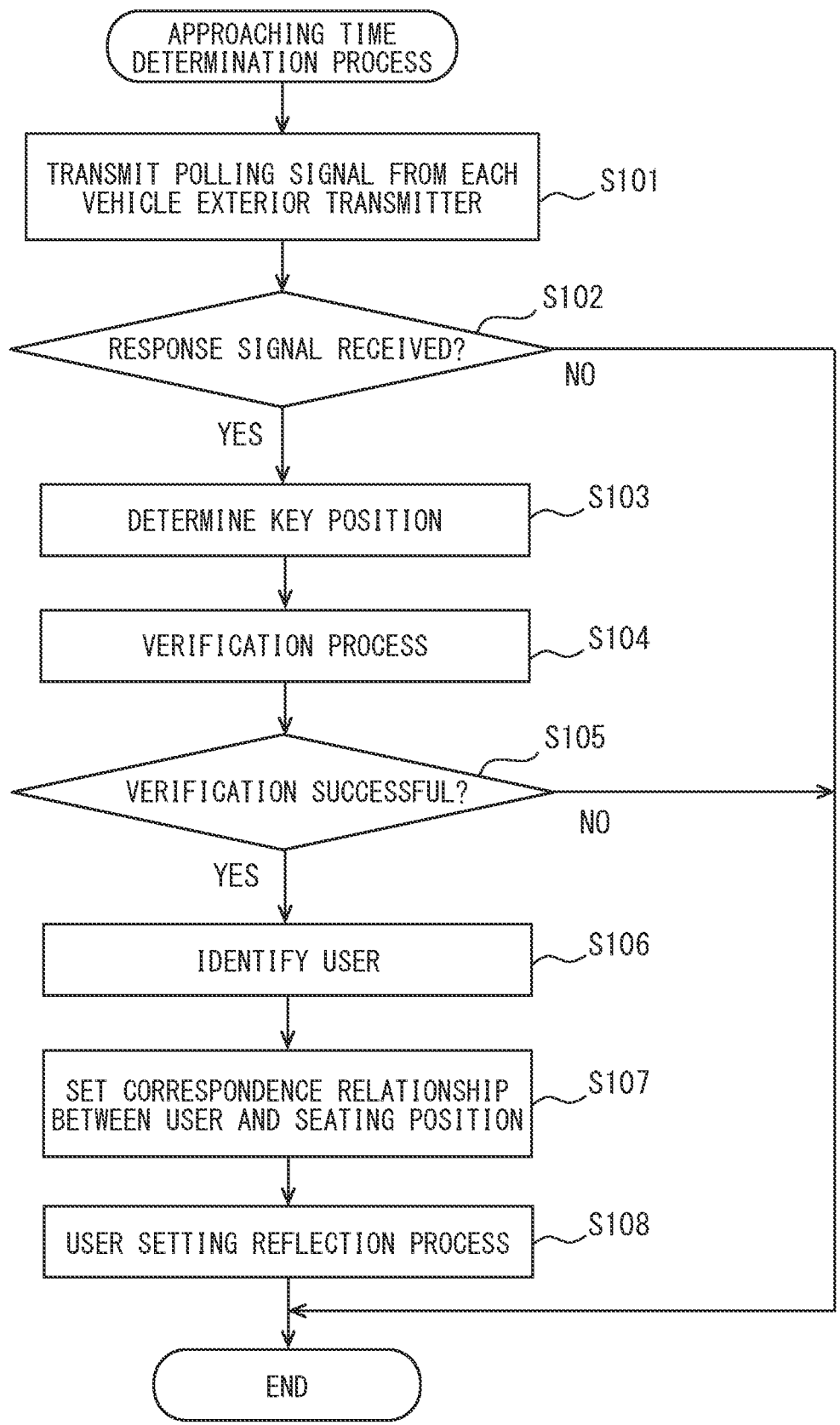
FIG. 6 is a flowchart of an approaching time determination process.

First, the approaching time determination process will be described with reference to a flowchart illustrated in FIG. 6. For example, while the vehicle Hv is parked, the approaching time determination process can be periodically performed at a predetermined polling cycle until it is detected that at least one smart key 3 is present in a vehicle compartment. The polling cycle can be, for example, 200 milliseconds. The approaching time determination process of the present disclosure includes steps S101 to S108 as an example. Note that the number of steps, the processing procedure, and the execution condition included in the approaching time determination process can be changed as appropriate.

In step S101, the position identification unit F4 cooperates with the transmission processing unit F2 to cause the respective vehicle exterior transmitters 5 sequentially transmit polling signals, and the process proceeds to step S102. By shifting the timing at which each LF transmitter transmits the LF signal, it is possible to prevent a signal transmitted from a certain LF transmitter from interfering with a signal transmitted from another LF transmitter. In step S102, the position identification unit F4 cooperates with the receiving processing unit F3 to determine whether a response signal has been returned from at least one of the plurality of smart keys 3. When a response signal is returned from at least one smart key 3, an affirmative determination is made in step S102, and the process proceeds to step S103. On the other hand, when the response signal has not been received from any of the smart keys 3, a negative determination is made in step S102, and this flow ends.

Note that there may be a case where a plurality of smart keys 3 is present around the vehicle, such as a case where a plurality of users is approaching the vehicle Hv at the same time. For example, when the smart key 3A is present near the driver seat door and the smart key 3B is present near the assistant driver seat door, a response signal can be received from each of the smart keys 3A and 3B. When the response signals from the plurality of smart keys 3 are received in steps S101 to S102, the response signal having the highest priority among the plurality of smart keys 3 may be set to be processed according to the predetermined priority, and the following processing may be performed. Of course, the processing in and after step S103 may be performed for each of the plurality of detected smart keys 3. When the response signal is returned from any of the smart keys 3, transmission of the polling signal from the other vehicle exterior transmitter 5 may be stopped, and the process may proceed to step S103. The smart key 3 that has returned the response signal corresponds to the entry candidate key as described above.

In step S103, the position identification unit F4 identifies the response acquisition transmitter based on the timing at which the response signal to the polling signal is received. Here, the response acquisition transmitter is a vehicle exterior transmitter corresponding to a transmission source of the polling signal from which the response signal has been successfully received. For example, in a case where the position identification unit F4 receives a response signal within a predetermined response standby time from a time point at which the polling signal is transmitted from the DF transmitter 5A, the position identification unit F4 determines that the response acquisition transmitter is the DF transmitter 5A.

Then, the position identification unit F4 determines the position where the smart key 3 that has returned the response signal is present based on the installation position of the response acquisition transmitter. For example, when the response acquisition transmitter is the DF transmitter 5A, it is determined that the smart key 3 is present near the driver seat door. When the response acquisition transmitter is the PF transmitter 5B, it is determined that the smart key 3 is present near the assistant driver seat door. As described above, the position identification unit F4 determines the position of the smart key 3 outside the vehicle compartment by using the vehicle exterior transmitter 5.

In addition, in step S103, the target door setting unit F5 sets a door corresponding to the position of the entry candidate key identified by the position identification unit F4 as the target door. For example, a door present at a position closest to the entry candidate key is set as the target door. More specifically, in a case where the response acquisition transmitter is the DF transmitter 5A, the driver seat door is set as the target door. In a case where the response acquisition transmitter is the PF transmitter 5B, the assistant driver seat door is set as the target door. The same applies when the response acquisition transmitter is the DR transmitter 5C or the PR transmitter 5D, and the door closest to the installation position of the corresponding transmitter is set as the target door. The target door refers to a door that is likely to be opened by a user. The setting of the target door is an option and may be omitted.

In step S103, the seating position determination unit F6 sets a seat corresponding to the position of the entry candidate key identified by the position identification unit F4 as the target seat. For example, the seating position determination unit F6 sets a seat present at a position closest to the estimated position of the entry candidate key as the target seat. In a case where the response acquisition transmitter is the DF transmitter 5A, the driver seat is set as the target seat. In a case where the response acquisition transmitter is the PF transmitter 5B, the assistant driver seat is set as the target seat. The same applies when the response acquisition transmitter is the DR transmitter 5C, the PR transmitter 5D, or the like, and the seat closest to the installation position of the corresponding transmitter is set as the target seat. A seat closest to the target door corresponds to the target seat. The target seat corresponds to a seat on which the user corresponding to the entry candidate key is likely to sit. When the process in step S103 is completed, the process proceeds to step S104.

In step S104, the verification processing unit F41 cooperates with the transmission processing unit F2 to sequentially transmit challenge signals addressed to the respective smart keys 3 from the response acquisition transmitters identified in step S103 at predetermined intervals, thereby attempting vehicle exterior verification. In a case where code verification is successful in any of the plurality of smart keys 3 associated with the vehicle Hv, an affirmative determination is made in step S105, and the process proceeds to step S106. On the other hand, in a case where the verification of any of the smart keys 3 is not successful, a negative determination is made in step S105, and this flow ends. By executing step S104, the key ID of the smart key 3 present in the response area of the response acquisition transmitter 5 is identified by the response code or the like. In a case where the response signal to the polling signal includes the key ID of the smart key 3 as the transmission source, only the challenge signal addressed to the smart key 3 may be transmitted in step S104. According to such a configuration, the number of communications can be further reduced.

In step S106, the user who is the holder of the smart key 3 is identified based on the key ID of the entry candidate key authenticated by the vehicle exterior verification in step S105, and the process proceeds to step S107. In step S107, the seating position determination unit F6 determines the seat (that is, the target seat) corresponding to the position of the entry candidate key identified in step S103 as the seating position of the user registered as the holder of the entry candidate key. Then, data indicating the determination result is stored in the seating position storage unit M2. For example, in a case where the entry candidate key is the smart key 3B and the target seat is determined to be the driver seat, data in which the seating position of the user B who is the holder of the smart key 3B is set to the driver seat is stored in the seating position storage unit M2. When the process in step S107 is completed, the process proceeds to step S108.

In step S108, the user setting reflection unit F7 cooperates with the body ECU 11 or the like to automatically change the environment corresponding to the seat for which the seated person is identified in step S107 based on the vehicle setting data of the seated person. For example, when it is determined that the seated person on the driver seat is the user B, the seat position, the steering wheel position, and the like of the driver seat are automatically adjusted based on the vehicle setting data of the user B. In addition, the welcome illumination may be turned on in a color preset by the user B. The welcome illumination may be provided for each door. For example, in a case where the seated person on the driver seat is determined to be the user B and the seated person in the assistant driver seat is determined to be the user A, the color of the welcome illumination around the driver seat door may be a color corresponding to the user B, and the color of the welcome illumination around the driver seat door may be a color corresponding to the user A. According to this configuration, the user can know how the system recognizes the seated person for each seat based on the color of the welcome illumination. For example, the user can visually grasp whether the recognition state of the system regarding the seating position is correct.

Figure 7:
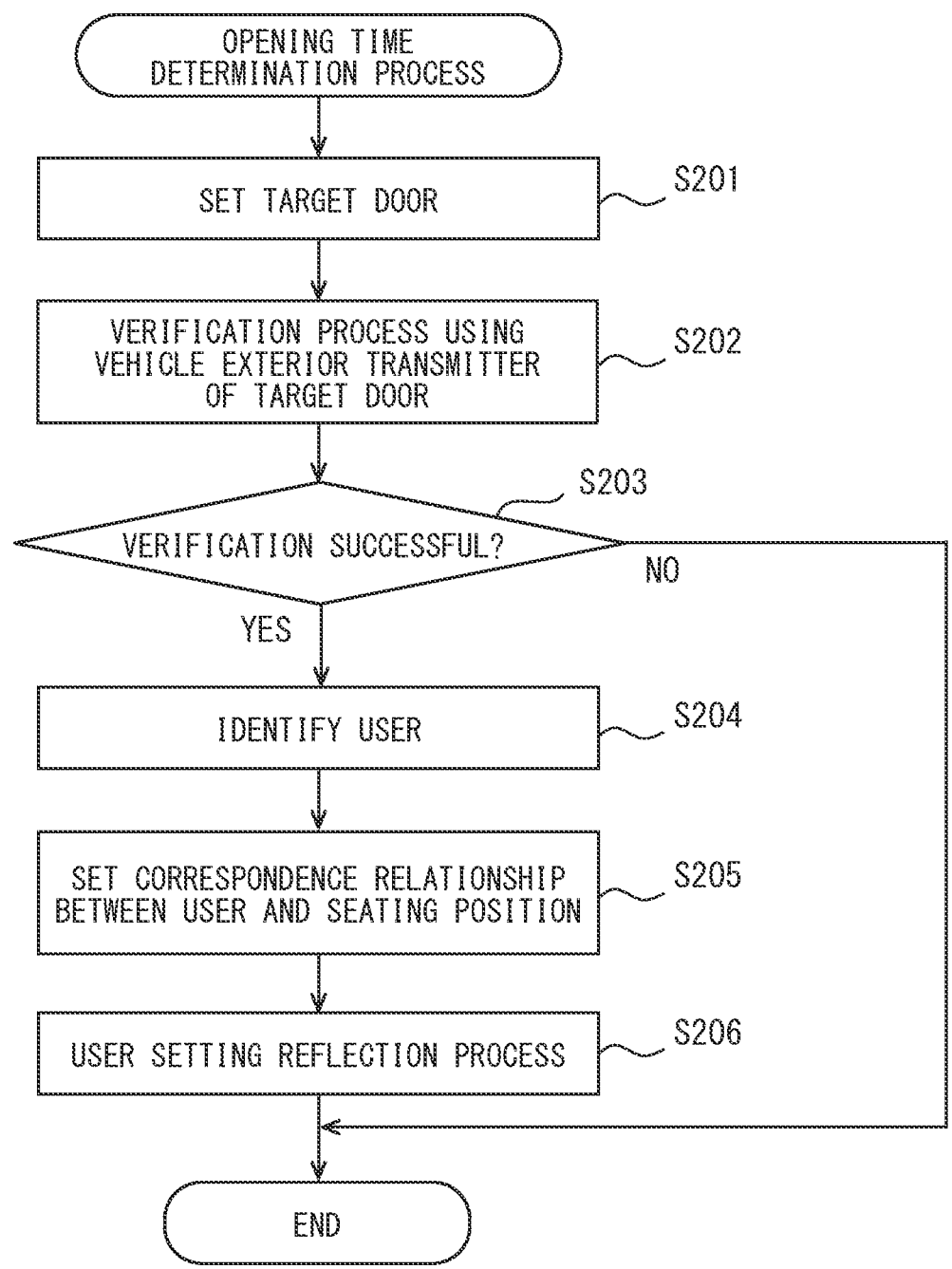
FIG. 7 is a flowchart of an opening time determination process.

Next, the opening time determination process will be described with reference to a flowchart illustrated in FIG. 7. The opening time determination process may be performed, for example, when the opening operation detection unit F1A detects that the user has performed the opening operation. The opening operation here can be rephrased as an unlocking operation. Specifically, as described above, pressing the door button 82, touching the touch sensor 81, or the like may correspond to the opening operation. In addition, the opening operation can include an operation of actually opening the door. The opening time determination process is performed, for example, in a state where the door of the vehicle Hv has already been unlocked or in a case where it has been confirmed that another smart key 3 is already present in a vehicle compartment. The opening time determination process according to the present embodiment includes steps S201 to S206 as an example. Note that the number of steps, the processing procedure, and the execution condition included in the opening time determination process can be changed as appropriate.

First, in step S201, the target door setting unit F5 sets the door on which the opening operation has been performed as the target door, and the process proceeds to step S202. A seat corresponding to the target door corresponds to the target seat. In step S202, the verification processing unit F41 cooperates with the transmission processing unit F2 to sequentially transmit challenge signals addressed to the respective smart keys 3 from the vehicle exterior transmitter 5 corresponding to the target door at predetermined intervals. As a result, the smart key 3 present near the target door is searched for. The vehicle exterior transmitter 5 corresponding to the target door is the vehicle exterior transmitter 5 closest to the target door or provided at the target door. For example, the vehicle exterior transmitter 5 corresponding to the driver seat door is the DF transmitter 5A. The vehicle exterior transmitter 5 corresponding to the assistant driver seat door is the PF transmitter 5B. In a case where the smart key 3 present near the target door is identified by the approaching time determination process, the verification process for the smart key 3 among the plurality of smart keys 3 may be performed first.

In a case where the verification process is successful in any of the plurality of smart keys 3 associated with the vehicle Hv, an affirmative determination is made in step S203, and the process proceeds to step S204. On the other hand, in a case where the verification of any of the smart keys 3 is not successful, a negative determination is made in step S203, and this flow ends. Note that the smart key 3 for which the verification process has succeeded corresponds to an entry candidate key. In step S204, the user who is the holder of the smart key 3 is identified based on the key ID of the entry candidate key identified in step S203, and the process proceeds to step S205.

In step S205, the seating position determination unit F6 stores, in the seating position storage unit M2, data in which the seated person on the target seat is set as the user corresponding to the entry candidate key. For example, in a case where the entry candidate key is the smart key 3C and the target door is determined to be the assistant driver rear seat door, the seated person on the assistant driver seat rear seat is set as the user C. When the process in step S205 is completed, the process proceeds to step S206.

In step S206, as in step S108, the user setting reflection unit F7 cooperates with the body ECU 11 and the like to automatically change the environment corresponding to the seat in which the seated person is identified in step S205 based on the vehicle setting data of the seated person. For example, the user setting reflection unit F7 activates the air conditioner in cooperation with the air conditioning ECU 10, and sets the vehicle interior environment around the target seat such as the target temperature and the air volume of the air conditioning to be an environment according to the preference of the seated person. Step S206 can be omitted in a case where there is no change in the seated person on the seat corresponding to the target door with respect to the result of the approaching time determination process and the vehicle interior environment around the target seat has already been adjusted.

Next, the closing time determination process will be described with reference to a flowchart illustrated in FIG. 8. The closing time determination process is performed, for example, with the vehicle state acquisition unit F1 detecting that the opened door is closed as a trigger. As in the opening time determination process, the closing time determination process is also performed when it is confirmed that any of the plurality of smart keys 3 is already present in a vehicle compartment. The closing time determination process of the present embodiment includes steps S301 to S307 as an example. Note that the number of steps, the processing procedure, and the execution condition included in the closing time determination process can be changed as appropriate.

First, in step S301, the target door setting unit F5 sets the closed door as the target door, and the process proceeds to step S302. For example, when this flow is started with the door for the rear seat on the driver seat side closed as a trigger, the rear seat on the driver seat side is the target seat in this flow.

In step S302, the seating position determination unit F6 refers to the seating position storage unit M2 to acquire the vehicle exterior determination result which is the results of the approaching time determination process and the opening time determination process described above, and the process proceeds to step S303. In step S303, the seating position determination unit F6 determines whether a seated person on the target seat is registered based on the data read in step S302. In a case where the seated person on the target seat has not yet been identified, a negative determination is made in step S303, and this flow ends. On the other hand, in a case where the seated person on the target seat has been identified, an affirmative determination is made in step S303, and the process proceeds to step S304.

In step S304, the entry determination unit F43 cooperates with the transmission processing unit F2 to cause the vehicle interior transmitter 6 corresponding to the target seat to transmit a challenge signal addressed to the smart key 3 (hereinafter, the target key) corresponding to the user set as the seated person on the target seat. Accordingly, the vehicle interior verification is performed on the target key. Note that the target key corresponds to an entry candidate key in the approaching time determination process or the opening time determination process. This process corresponds to a process of determining whether the target key as the entry candidate key entered the vehicle compartment. The target key also corresponds to the target device.

The vehicle interior transmitter 6 corresponding to the target seat is the vehicle interior transmitter 6 including the target seat in the response area. For example, in the present embodiment, the front seat transmitter 6A corresponds to the vehicle interior transmitter 6 corresponding to the driver seat and the assistant driver seat. The rear seat transmitter 6B corresponds to the vehicle interior transmitter 6 corresponding to the rear seat. That is, in a case where a plurality of vehicle interior transmitters 6 is provided as in the present disclosure, which vehicle interior transmitter 6 is used to perform the vehicle interior verification, in other words, which vehicle interior transmitter 6 is caused to transmit the challenge signal is derived from the position of the target key outside the vehicle compartment. For example, when it is determined that the position before the target key enters the vehicle compartment (that is, outside the vehicle compartment) is outside the driver seat door, a challenge signal is transmitted from the front seat transmitter 6A. As a result, it is possible to efficiently determine whether the smart key 3 detected outside the driver seat door entered the vehicle compartment.

As the verification process in step S304, in a case where the verification of the target key is successful, that is, in a case where the target key is found, an affirmative determination is made in step S305, and the processing proceeds to step S306. On the other hand, in a case where the verification process in step S304 fails, a negative determination is made in step S305, and this flow ends. In a case where the vehicle interior verification using the vehicle interior transmitter 6 corresponding to the target seat fails, the vehicle interior verification may be performed using another vehicle interior transmitter 6. This is because there may be a case where a user who opens the door of the driver seat places a bag at the footing place of the rear seat through a gap between the driver seat and the assistant driver seat and then closes the door.

In step S306, the seating position determination unit F6 determines that the seated person on the target seat is the user of the target key, and stores the data in the seating position storage unit M2. For example, in a case where the target seat is the driver seat and the target key is the smart key 3B, data in which the user B is set as a seated person on the driver seat is stored in the seating position storage unit M2. When the process in step S306 is completed, the process proceeds to step S307.

In step S307, the user setting reflection unit F7 cooperates with the body ECU 11 or the like to automatically change the environment corresponding to the seat in which the seated person is identified in step S306 based on the vehicle setting data of the seated person. The content of step S307 can be similar to that of step S108. In a case where there is no change in the seated person on the target seat and the vehicle interior environment around the target seat has already been adjusted, step S307 can be omitted.

Note that the seating position determination unit F6 is preferably configured to adopt the latest determination result and discard the old determination result in a case where a new seating position different from the determination result up to the previous time is obtained as the seating position of the same user. For example, in a state where the seating position of the user A is determined to be the rear seat on the assistant driver seat side in the approaching time determination process, when the seating position of the user A is determined to be the assistant driver seat in the opening time determination process, the determination result that the seating position of the user A is the rear seat on the assistant driver seat side is discarded. In this way, in a case where there is a contradiction in the determination result of the same user, a newer determination result is left and an older determination result is discarded. According to the above configuration, for example, in a case where the user A passes in front of the rear seat door and unlocks the assistant driver seat door, it is possible to reduce the possibility of making an error in the seating position of the user A. In addition, even in a case where the rear seat on the assistant driver seat side is opened and baggage is placed, and then the user A boards the assistant driver seat, the seating position of the user A is updated from the rear seat on the assistant driver seat side to the assistant driver seat by the closing time determination process. That is, even in a case where the user makes a complicated movement, the seating position of the user can be appropriately recognized.

Note that the approaching time determination process and the opening time determination process correspond to a process of identifying a user outside the vehicle compartment who is a user present outside the door corresponding to each seat. In addition, the closing time determination process corresponds to a process of determining a user in the vehicle compartment who is a user present inside the door corresponding to each seat. In a case where the determination result of the user outside the vehicle compartment for a certain seat is different from the determination result of the user in the vehicle compartment, the determination result of the user in the vehicle compartment may be preferentially applied. Furthermore, as another aspect, in a case where the determination result of a user outside the vehicle compartment for a certain seat is different from the determination result of a user in the vehicle compartment, an image indicating that a seated person on the seat is unknown may be displayed on the display 91 or the like. Alternatively, a guidance screen prompting selecting a seated person on the seat may be displayed.

Figure 9:
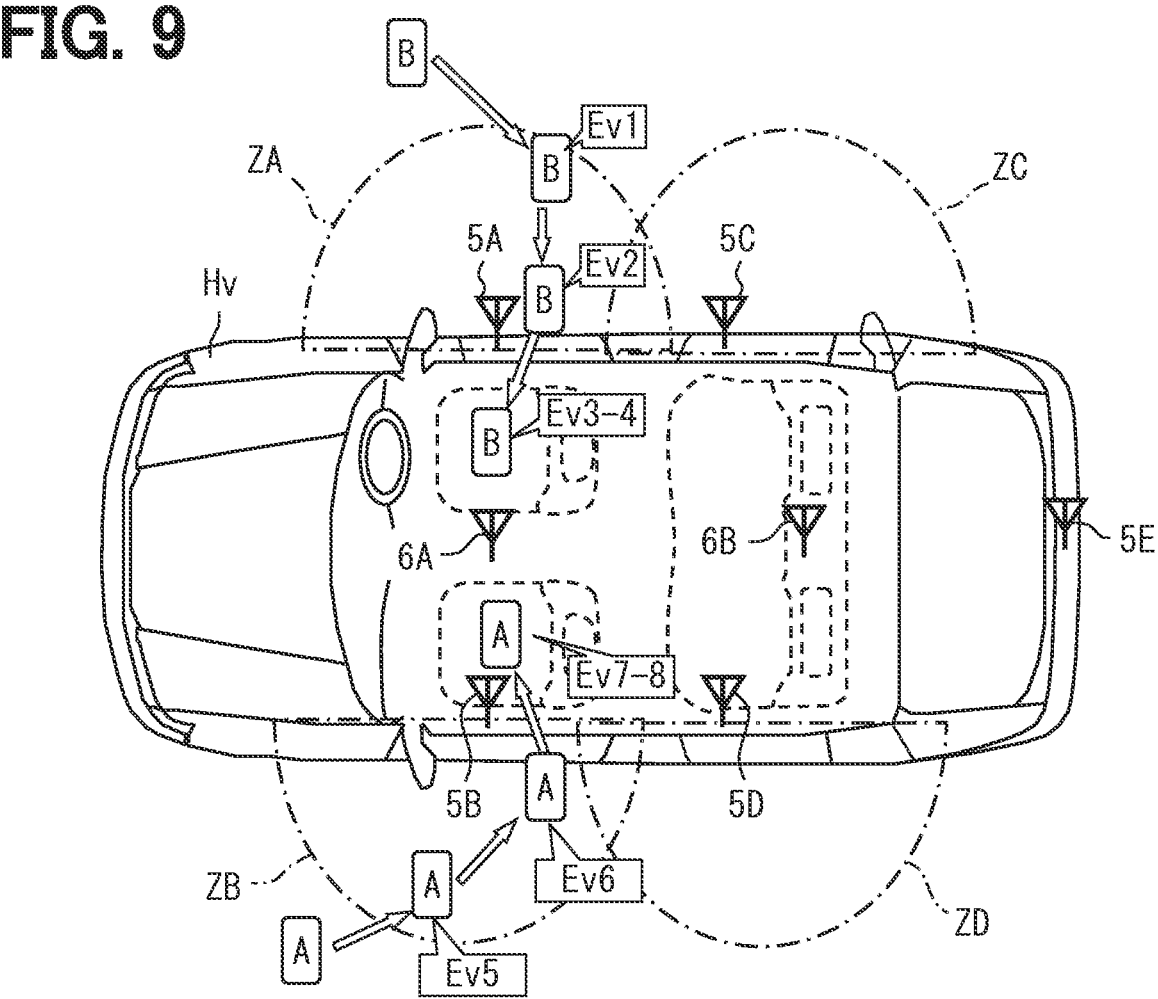
FIG. 9 is a diagram for explaining the operation of a seating position determination unit with respect to a series of actions from when the user approaches a vehicle to when the user boards the vehicle.

FIGS. 9 and 10 are diagrams for explaining the operation of the smart ECU 4 with respect to a series of movements of the user when boarding the vehicle. Here, as an example, a case where the user A boards the assistant driver seat after the user B boards the driver seat will be described as an example. Usually, a user who uses a certain seat approaches a target door, opens the door, sits on the seat, and closes the door. Accordingly, in a case where the user B uses the driver seat, the user B approaches the driver seat door (Ev1), and unlocks the door by pressing the door button 82 of the driver seat door or touching the touch sensor 81 (Ev2). Since the approaching time determination process is performed at the timing of Ev1, the smart ECU 4 can identify that the seated person on the driver seat is the user B. Further, at the timing of Ev2 that follows, the opening time determination process is performed with the operation for unlocking the door as a trigger, and the smart ECU 4 can again identify that the seated person on the driver seat is the user B.

By determining the seating position of the user B outside the vehicle compartment at two timings in this manner, even when the seating position of the user B cannot be identified in any one of the two timings, the seating position of the user B can be identified as the driver seat from either of the determination results. In addition, by identifying the seating position before the user B boards the vehicle, the position of the driver seat and the steering wheel position can be adjusted in a state where the user B is not seated. As a result, loads on various motors can be reduced, and comfort of the user can be enhanced.

In addition, when the user B sits on the driver seat (Ev3) and closes the driver seat door (Ev4), the smart ECU 4 performs the above-described closing time determination process. In the closing time determination process, the smart key 3 to be searched for is only the smart key 3B corresponding to the user B who is determined to be a seated person on the driver seat in the approaching time determination process or the opening time determination process. Since not all the smart keys 3 are set as search targets, power consumption of the in-vehicle system 2 can be suppressed. The responsiveness can be enhanced by narrowing down the smart key 3 to be searched for. By performing the closing time determination process based on the result of the opening time determination process in this manner, responsiveness can be enhanced while suppressing power consumption.

Thereafter, at the timing when the user A approaches the vehicle Hv (Ev5) and puts the hand on the outer door handle for the assistant driver seat (Ev6), the opening time determination process is performed. At the timing when the user A approaches the vehicle Hv, it has been confirmed that the vehicle Hv has already been unlocked and the smart key 3B is present in a vehicle compartment. In view of the above, as an aspect, it is possible to omit the approaching time determination process accompanied by vehicle exterior polling for quickly unlocking the vehicle Hv. When it is confirmed that the smart key 3 is present in a vehicle compartment, the power consumption of the in-vehicle system 2 can be further reduced by omitting the approaching time determination process.

In addition, even in a case where it is confirmed that the smart key 3 is present in a vehicle compartment, it is possible to identify the user who is about to open the door and the smart key 3 by performing the opening time determination process. Accordingly, even in a case where the user B is already aboard the vehicle, it is possible to detect that the user A intends to board the vehicle. Further, before the user A boards the assistant driver seat, the position and the height of the assistant driver seat can be set in accordance with the preference of the user A.

In a case where the presence of the smart key 3B in a vehicle compartment has been confirmed in the closing time determination process, the smart key 3B is preferably excluded from a target to be searched for in the subsequent opening time determination process. By excluding the smart key 3 that has been confirmed to be present in a vehicle compartment from a target to be searched for in the opening time determination process, it is possible to enhance the responsiveness while suppressing the power consumption. In addition, in a case where the user A sits on the assistant driver seat (Ev7) and closes the assistant driver seat door (Ev8), it is possible to confirm that the seated person on the assistant driver seat is truly the user A by performing the closing time determination process.

Note that, in the closing time determination process for a certain seat, when the smart key 3 corresponding to the user outside the vehicle compartment for the seat cannot be found, another smart key 3 may be searched for. This is because a case where the user B opens the door and another person is seated is also assumed. For example, in a case where both hands of the user C who is about to sit on the assistant driver seat are full with baggage or in a case where the user B assists boarding of the user C, a person who opens the door and a person who sits on the seat corresponding to the door are not necessarily the same. Further, when the guest boards the rear seat, the user B or the like may open the door for the rear seat to meet the guest. It is possible to further reduce the possibility that the system erroneously recognizes the seating position of each user by performing the process of determining the seated person again at the time of seating with the meaning of confirmation instead of terminating the determination of the seated person at the time of opening the door.

In the closing time determination process for a certain seat, in a case where the smart key 3 corresponding to the user outside the vehicle compartment for the seat cannot be found, the seated person on the seat may be determined to be unknown and the fact may be displayed on the display 91 or the like. In a case where the seated person is unknown, an image in which it is determined that the seated person is the guest may be displayed on the display 91 instead of an image directly expressing that the seated person is unknown. According to such a configuration, in a case where the seated person is truly the guest, it is possible to reduce a risk of giving discomfort to the guest by displaying that the seated person is unknown on the display 91.

In addition, in a general vehicle electronic key system disclosed in Patent Literature 1 and the like, search for a smart key (in other words, verification) is performed to check whether the smart key is present in a vehicle compartment periodically or when a predetermined event occurs. When at least one smart key is found in a vehicle compartment, no other smart key is searched for. This is because when searching for all the smart keys, the responsiveness deteriorates and the power consumption also increases.

In such a comparative configuration, only the user who first boards the vehicle Hv is recognized. In addition, even in a case where a certain user (for example, the user A) sits on a seat other than the driver seat, the vehicle interior environment around the driver seat is adjusted to the setting environment of the user A. In other words, a user who is not a driver may be regarded as a driver.

In contrast to such a comparative configuration, according to the configuration of the present disclosure, for example, even in a case where the user B sits on the driver seat after the user A sits on the assistant principal, it is possible to correctly determine that the seated person on the driver seat is the user B. In addition, since the timing of performing communication for determining the seated person is when only a specific scene such as a case where the open/closed state of the door has changed is added, it is possible to suppress the influence on the battery life of the smart key 3 and the vehicle battery. In addition, at the time of searching for the smart key 3 in a vehicle compartment, the smart key 3 that has not been detected at the time of the opening operation is excluded from a target to be searched for, so that the power consumption can be further reduced.

In addition, according to the configuration of the present embodiment, it can be realized by using existing facilities for a smart entry system. Therefore, the cost of introducing the occupant information acquisition system can be further reduced. It is also possible to suppress a design change in an existing system due to the introduction of the occupant information acquisition system.

As another assumed configuration for identifying the occupant attribute for each user aboard the vehicle Hv, a configuration in which an LF antenna is disposed for each seat and a user seated on the seat is identified based on a receiving situation of a signal from the mobile device at each LF antenna can be considered. However, it is difficult to clearly divide the communication area in the vehicle compartment for each seat, and there is a possibility that the seating positions of respective users are erroneously determined. In view of the above problem, according to the configuration of the present embodiment, information on a door opened and closed by a user is combined with a result of verification before and after the door opened and closed. Accordingly, even when response areas of LF transmitters overlap each other, it is possible to accurately identify a seated person for each seat.

In addition, in the assumed configuration, when the antenna is disposed for each seat, the cost may increase accordingly. On the other hand, according to the method of the present disclosure, the number of LF antennas set in the vehicle compartment can be reduced. That is, according to the method of the present disclosure, unlike the assumed configuration, there is an advantage that the number of communicators installed in a vehicle compartment can be suppressed and the possibility of making erroneous determination of the user's seating position can be reduced.

In an aspect, the configuration of the present disclosure described above corresponds to a configuration in which the smart key 3 identified by the vehicle exterior verification process immediately before the door is opened is preferentially set as the processing target of the vehicle interior verification performed immediately after the door is closed. Note that the term "immediately before a certain event" means, for example, within the three seconds before occurrence of the event. In addition, immediately after a certain event means, for example, within five seconds after occurrence of the event.

In addition, according to the above configuration, since unnecessary communication between the in-vehicle system 2 and the smart key 3 can be suppressed, power consumption in the smart key 3 can also be suppressed. In a case where the smart key 3 is a battery replaceable device, unnecessary operation of the smart key 3 leads to a reduction in battery life, which takes some time such as battery replacement. According to the configuration of the present disclosure, not only the power consumption of the in-vehicle system 2 but also the power consumption of the mobile device can be suppressed, and the merchantability of the smart key entry function and the convenience of the user can be enhanced.

Although the embodiment of the present disclosure has been described above, the present disclosure is not limited to the above-described embodiment, and various modifications described below are also included in the technical scope of the present disclosure, and various modifications other than the following can be made without departing from the scope of the present disclosure. In addition, the following various modifications can be appropriately combined and implemented. Note that members having the same functions as those of the members described in the above embodiment are denoted by the same reference numerals, and the description thereof will be omitted. In addition, in a case where only part of the configuration is referred to, the configuration of the embodiment described above can be applied to other parts.

[Supplement to Execution Scene of Seating Position Determination Process]

In the above description, the aspect has been exemplified in which the seating position determination process is performed when the user approaches the vehicle Hv, when the opening operation is performed on any door, and when the opened door is closed, but the timing of performing the seating position determination process is not limited thereto. For example, a process flow similar to the closing determination process may be performed with the seating sensor 83 detecting seating of the user by as a trigger. A processing flow similar to the closing determination process may be performed with detection of putting on the seat belt as a trigger. Furthermore, a processing flow similar to the close determination process may be performed with a start button, which is a button for turning on the traveling power source, pressed as a trigger.

Figure 8:
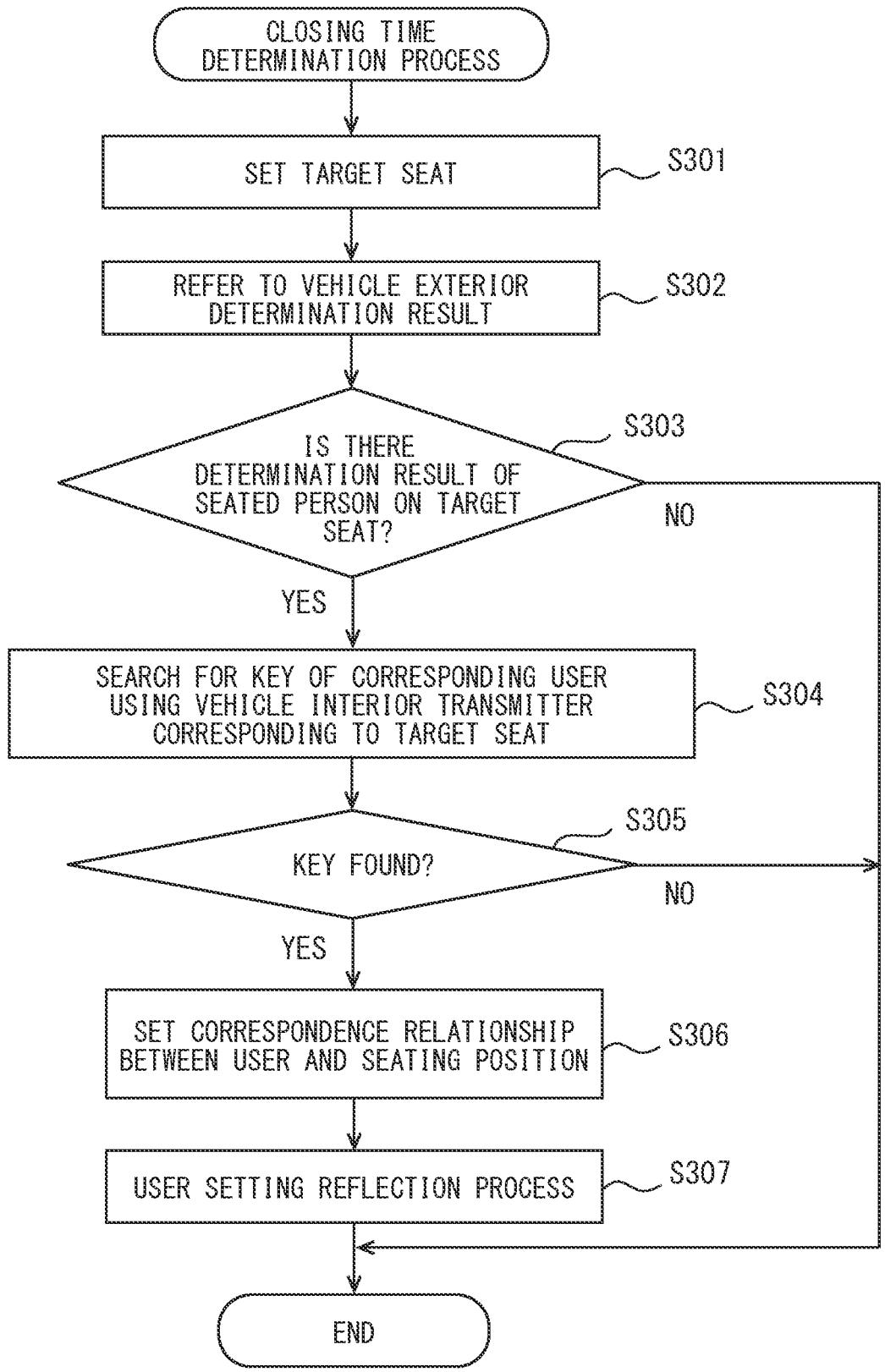
FIG. 8 is a flowchart of a closing time determination process.

The seating position determination process performed with the wearing of the seat belt or the pressing of the start button as a trigger can be a sequence in which the reference data in step S302 of FIG. 8 is replaced with the previous determination result. The signal indicating that the door is closed and that is output from the courtesy switch 84 corresponds to an example of the boarding signal. In addition, a signal indicating that a person is seated and that is output from the seating sensor 83 corresponds to an example of the boarding signal. In addition, a signal indicating the wearing state of the seat belt and an output signal when the start button is pressed also be included in the boarding signal.

Note that, in a case where, for the same user, the determination result of the latest seating position is different from the past determination result, the recognition state notification unit F8 may display a screen for confirming the seating position of the corresponding user on the display 91. In addition, among the plurality of seats, a seat to be excluded from a candidate for the seating position of the user may be registered in advance based on a user operation. For example, a seat on which a child seat is mounted may be set to be excluded from the candidate for a user's seating position in the seating position determination process. According to this configuration, for example, in a case where the user A opens the door of the rear seat in order for the user A to put the child on the child seat installed in the rear seat, it is possible to reduce the possibility that the seated person on the rear seat is erroneously determined to be the user A. That is, the seating position determination unit F6 may be configured not to determine the seated person on a predetermined seat such as a seat on which a child seat is mounted. The seating position determination unit F6 may be configured to identify only a seated person on a specific seat such as a driver seat and an assistant driver seat.

[Supplement to Individual Setting Reflection Process]

The vehicle control performed in each phase at the time of approach, at the time of door opening, and at the time of door closing may be different. For example, in the approaching time determination process, while lighting of the welcome illumination is performed, adjustment of the seat position, activation of the air conditioner, and the like may be suspended. This is because it is uncertain whether the user truly uses the vehicle Hv only when the user approaches the vehicle Hv. Therefore, it is preferable to suspend the activation and the like of the air conditioner until the vehicle Hv is unlocked. The same applies to the adjustment of the seat position. Note that the vehicle control performed in each phase at the time of approach, at the time of door opening, and at the time of door closing may be configured to be settable by the user.

[Supplement to Method for Determining Occupant on Driver Seat]

In the above embodiment, when the user as a driver places the bag containing the smart key 3 on the assistant driver seat or the trunk after unlocking the assistant driver seat door, the driver may not be able to be identified. On the other hand, as a general use case of the vehicle, the user who unlocks the vehicle Hv is often a person (so-called driver) seated in the driver seat.

On the basis of the above circumstances, in a case where the vehicle Hv is unlocked by a remote unlocking signal transmitted from the smart key 3, the smart ECU 4 may determine an unlocking person who is a user corresponding to the smart key 3 used for unlocking as a driver. The same applies to a case where the door is unlocked by a switch/sensor provided at a door other than the door for the driver seat, such as the door for the assistant driver seat. Note that unlocking by a remote unlocking signal transmitted from the smart key 3 may also be referred to as wireless unlocking or remote unlocking.

Figure 11:
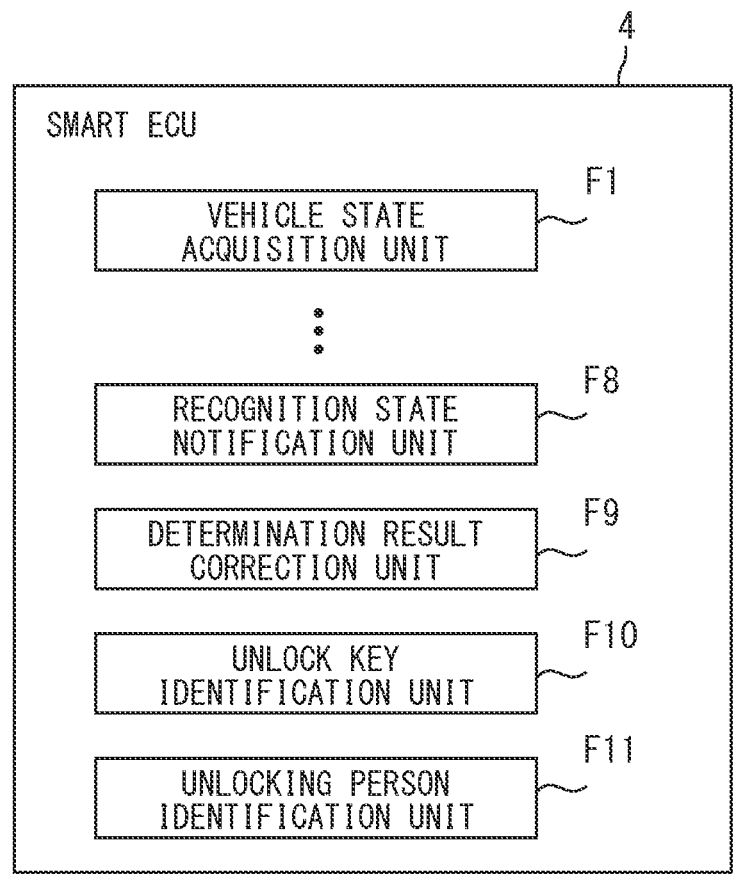
FIG. 11 is a block diagram illustrating a modification of the smart ECU.

As a configuration corresponding to the above technical idea, for example, as illustrated in FIG. 11, the smart ECU 4 includes an unlock key identification unit F10 and an unlocking person identification unit F11 in addition to the above-described vehicle state acquisition unit F1 and the like. The unlock key identification unit F10 is configured to identify the unlock key, which is the smart key 3 used for unlocking, based on the key ID included in the unlocking instruction signal or the key ID acquired in the verification process. The unlocking person identification unit F11 identifies the unlocking person from among the plurality of users based on the key ID of the unlock key identified by the unlock key identification unit F10. Specifically, the unlocking person identification unit F11 regards the user corresponding to the smart key 3 used for unlocking as an unlocking person. Since the smart key 3 is associated with the user, identifying the unlock key corresponds to identifying the unlocking person. The unlocking person identification unit F11 and the unlock key identification unit F10 may be integrated.

Figure 12:
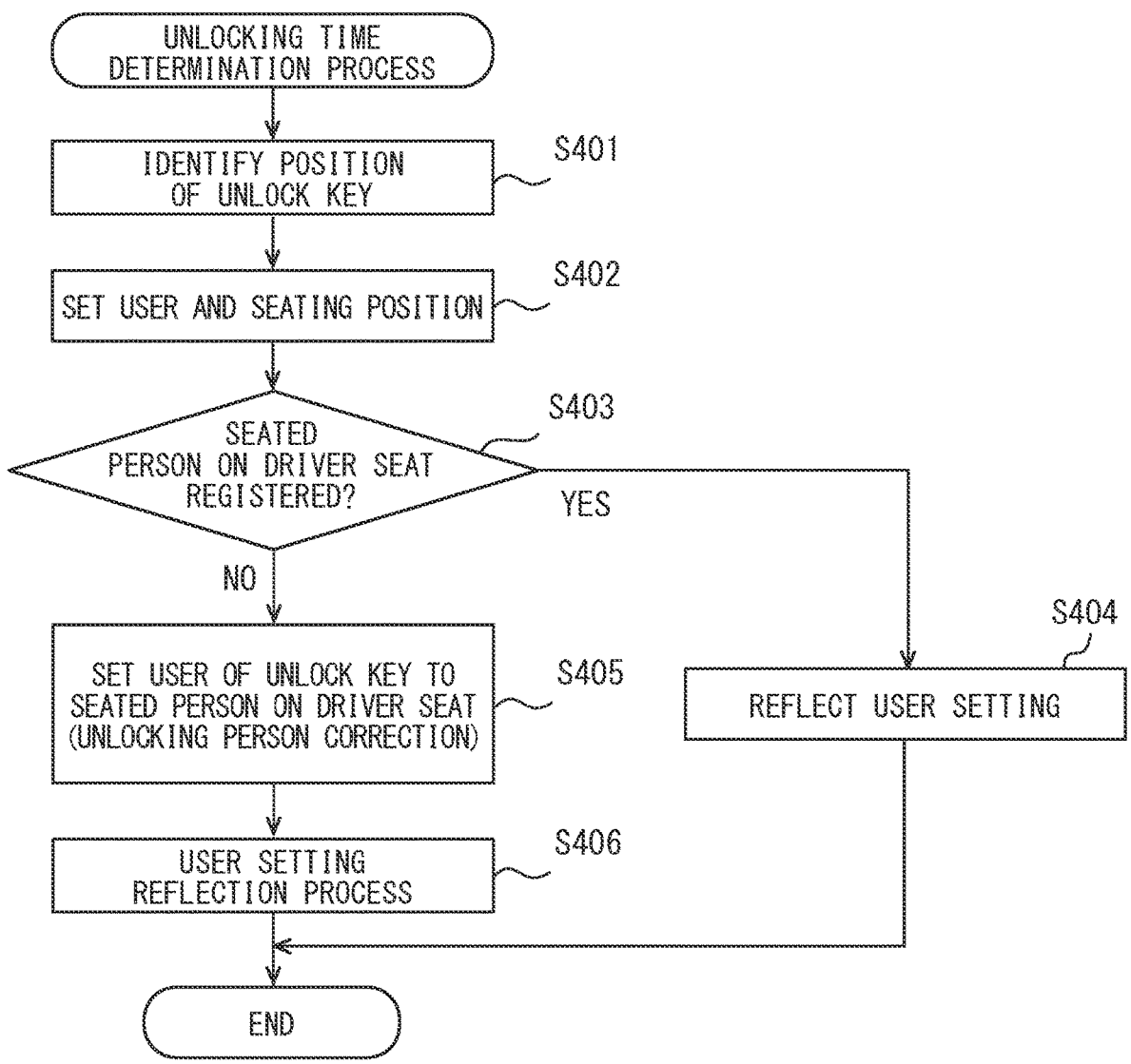
FIG. 12 is a flowchart of an unlocking person correction process.

As described above, the smart ECU 4 including the unlocking person identification unit F11 and the like performs, for example, the flowchart illustrated in FIG. 12 as an unlocking time determination process. The unlocking time determination process of the present disclosure includes steps S401 to S405 as an example. Of course, the number of steps, the processing procedure, and the execution condition included in the unlocking time determination process can be appropriately changed. The unlocking time determination process is performed when the doors of the vehicle Hv are unlocked.

First, in step S401, the position identification unit F4 determines the position of the unlock key, which is the smart key 3 used for unlocking, and the process proceeds to step S402. The position of the unlock key may be determined on a door basis or a seat basis, such as near which door the position is located. That is, step S401 corresponds to the process of identifying the target door or the process of identifying the seat corresponding to the position of the unlock key. Note that, in a case where the wireless unlock is performed, the position of the unlock key may be unknown, or a result of the approaching time determination process that can be separately performed may be used.

In step S402, the user associated with the unlock key is set as the seated person of the seat corresponding to the target door, and the process proceeds to step S403. For example, in a case where the unlocking operation is performed on the door for the assistant driver seat, the user associated with the unlock key is set as the seated person on the assistant driver seat. In a case where the unlocking operation is performed on the driver seat door, the user associated with the unlock key may be set as the seated person on the driver seat. In this case, it is the above-described opening time determination process.

In step S403, it is determined whether the seated person on the driver seat has been registered as a result of step S402. In a case where a seated person on the driver seat is already registered because another user is seated or the like, an affirmative determination is made in step S403, and the process proceeds to step S404. In step S404, the vehicle interior environment around the target seat is adjusted according to the vehicle setting data of the unlocking person based on the determination result in step S402, and this flow ends. On the other hand, in a case where the seated person on the driver seat is unregistered, a negative determination is made in step S403, and the process proceeds to step S405.

In step S405, as the unlocking person correction process, the seating position determination unit F6 sets the user of the unlock key as a seated person on the driver seat, and the process proceeds to step S406. Note that, in this case, the same user can be registered as a seated person on a plurality of seats. In step S406, for example, the user setting reflection unit F7 changes the position of the driver seat, the steering wheel position, and the like to a state according to the user's preference. Further, based on the determination result in step S402, the vehicle interior environment around the target seat is adjusted according to the vehicle setting data of the unlocking person.

According to the above configuration, for example, in a case where the user A unlocks the assistant driver seat door of the vehicle Hv, places a bag or the like including the smart key 3A on the assistant driver seat, and then sits on the driver seat, the seating position of the user A is determined to be the assistant driver seat by step S402, the opening time determination process, or the like. In addition, the user A is also registered as a seated person on the driver seat by the process in step S405.

In the above operation example, in a case where the user A is truly a seated person on the driver seat, the recognition result of the system that the seated person on the driver seat is the user A matches the actual seated person, so that the convenience of the user is not deteriorated. Further, in a case where the user A is seated on the assistant driver seat as it is and another user (for example, the user B) is seated on the driver seat, the seated person on the driver seat is updated from the user A to the user B by the opening time determination process or the closing time determination process which is separately performed. As a result, the vehicle interior environment around the driver seat is readjusted to an environment according to the preference of the user B who is an actual driver. As described above, according to the above method, even when the user as a driver places the smart key 3 in a seat other than the driver seat such as the assistant driver seat, it is possible to reduce the possibility of lowering the convenience of the user.

In the above operation example, for example, in a case where the seating sensor 83 of the assistant driver seat does not detect seating of a person even after the door for the assistant driver seat is closed, the determination result correction unit F9 may correct the seated person on the assistant driver seat to be unclear from the user A. According to this configuration, unnecessary adjustment of the position and the like of the assistant driver seat for the user A can be suppressed. The determination result of the closing time determination process may be validated on condition that seating of the occupant is detected by the seating sensor 83.

In a case where the user as the unlocking person is set as a seated person on the driver seat by the unlocking person correction process, the recognition state notification unit F8 may display, on the display 91, an image indicating that it is determined that the seated person on the driver seat is the user as the unlocking person. The display screen of the display 91 when the unlocking person is determined to be a seated person on the driver seat in the unlocking person correction process may have contents different from those of the display screen when the driver is identified in the opening/closing time determination process. This is because there is a relatively high possibility that the driver set in the unlocking person correction process is erroneously set as compared with the case where the driver is identified in the opening/closing time determination process. In other words, this is because there remains a possibility that another user will sit on the driver seat later.

That is, the display image indicating the driver set in the unlocking person correction process is preferably an image different from an image displayed when the driver is identified in the opening time determination process or the closing time determination process in a sense of prompting the user to confirm. The recognition state notification unit F8 may be configured not to display the determination result confirmation image in a case where the driver is identified in the opening time determination process or the closing time determination process, while to display the determination result confirmation image in a case where the driver is set in the unlocking person correction process.

In addition, in a case where the user as a driver is identified in the opening time determination process or the like for the driver seat door, the user setting reflection unit F7 automatically adjusts the position of the driver seat to a target position determined according to the vehicle setting data of the user. On the other hand, when the driver is determined in the unlocking person correction process, the automatic adjustment may be ended when the driver seat is moved halfway to the target position without completely adjusting the position to the target position. For example, when the driver is determined in the unlocking person correction process, adjustment of the seat position may be stopped at the time point when the adjustment is made to the position between a position before the adjustment and the target position. As described above, this is because there remains a possibility that another user will board the driver seat. In addition, even when the user set in the unlocking person correction process is truly a driver, the position of the driver seat is adjusted halfway, so that the trouble for adjusting the position of the driver seat can be reduced. As described above, the smart ECU 4 may be configured such that the vehicle control (in other words, the system response) to be performed differs between a case where the door is unlocked by using a facility provided on the door for the driver seat and a case where the door is unlocked by another method.

[Supplement to Application Example of Personal Setting for Each User]

When the seating position determination unit F6 determines that the occupant on the driver seat is the user A, the user setting reflection unit F7 may be configured to search for a smartphone of the user A and establish wireless connection with the smartphone by Bluetooth (registered trademark) or the like. That is, the user setting reflection unit F7 may be configured to set the smartphone of the user who plays the role as the driver for the wireless connection target. In addition, the smart ECU 4 may be configured to read a destination registered in advance in the smartphone from the smartphone of the user A as the driver and input the destination to the navigation device.

In addition, for example, when the seating position determination unit F6 determines that the seated person on the rear seat on the assistant driver seat side is the user B, the state of the vehicle equipment for the rear seat may be switched to that for the user B. Among the elements constituting the vehicle interior environment for the rear seat, the elements for which individual setting can be applied include an air conditioning temperature, an air volume, a wind direction, a seat position, and the like. Further, in a case where the in-vehicle system 2 includes a display for a rear seat, a screen of the smartphone of the user B may be displayed on the display for the rear seat. The vehicle setting data for each user may be dividedly registered for each seating position such as a case where the user sits on the driver seat, a case where the user sits on the assistant driver seat, and a case where the user sits on the rear seat.

Although the mode in which the smart ECU 4 collectively holds the vehicle setting data for each user is described above, the present invention is not limited thereto. The vehicle setting data for each user may be stored in the smart key 3 of each user.

In addition, each ECU corresponding to a facility that can be controlled may store the vehicle setting for each user in a range related to the ECU. For example, the body ECU 11 may include the setting for each user with respect to the seat position, the navigation ECU may include the setting for each user with respect to the navigation device, and the air conditioning ECU may include the air conditioning setting such as the vehicle compartment interior temperature. In the configuration in which the ECUs hold the vehicle setting data for respective users in a distributed manner, the smart ECU 4 notifies each ECU of the user ID for each seat. In addition, each ECU reads the vehicle setting corresponding to the seated person of the seat based on the user ID of the seat of which the smart ECU 4 makes a notification and changes the setting. This configuration also achieves effects similar to those of the above-described embodiment.

[Supplement to Function of Smart ECU 4]

According to the smart ECU 4 described above, it is possible to identify at least how many people are on board and who is on which seat. The occupant configuration can also be identified. The occupant configuration here can include the number of occupants, the age and gender of each occupant, and the like. As a result, for example, when an emergency call is made in the event of an accident, it is possible to notify the center or the like of the occupant configuration, and an ambulance corresponding to the number of occupants can be promptly disposed.

Note that, in a case where the seating sensor 83 detects that a person is seated on a certain seat, but it has not been possible to identify which of the users A to D the person corresponds to, it may be determined that the seated person on the seat is unknown and the fact may be registered in the seating position storage unit M2. According to this configuration, even in a case where a guest who is a person other than the user is aboard the vehicle, it is possible to identify the actual number of occupants.

In addition, the smart ECU 4 may calculate the center of gravity of the vehicle from the boarding position of each user and the weight of each user, and notify the ECU configured to control the balance of the vehicle body of the result. As a result, the vehicle body balance can be automatically adjusted to an appropriate state. In addition, the optical axis of the headlight may be automatically adjusted by notifying the body ECU 11 of the calculated center of gravity of the vehicle.

[Supplement to Method for Identifying Position of Smart Key 3]

The radio wave reach distance of each LF transmitter may be set to about several meters to 10 meters. In this case, the smart ECU 4 estimates the distance from each LF transmitter to the smart key 3 based on the communication status between each LF transmitter and the smart key 3, and combines the estimation results to estimate the position of the smart key 3. For example, the smart key 3 includes a circuit for detecting the received signal intensity, and returns a response signal including received signal strength information indicating the received signal strength of the response request signal transmitted from each LF transmitter. The position identification unit F4 estimates the distance from the LF transmitter as the transmission source to the smart key 3 from the received signal strength information included in the response signal. The position identification unit F4 may identify the position of the smart key 3 from the distances from the three LF transmitters having different installation positions and the installation positions of the three LF transmitters in the vehicle Hv.

Note that, in general, wireless signals attenuate in the process of propagating in space. Therefore, the larger the distance between the smart key 3 and the LF transmitter, the smaller the received signal intensity. Specifically, in the LF band, a region within several tens of meters from the LF transmitter corresponds to a near field in which an amount of attenuation with respect to a distance is significant. Therefore, the position identification unit F4 can obtain the distance between the LF transmitter that has transmitted the response request signal and the smart key 3 from the received signal strength information included in the response signal returned in response to the response request signal.

According to the above aspect, the position identification unit F4 can identify the position of the smart key 3 with respect to the vehicle Hv when the position identification unit F4 can receive response signals to the response request signals transmitted from at least three LF transmitters. According to the above configuration, the specific position coordinates of the smart key 3 with respect to the vehicle Hv can be identified, and the target door can be identified more accurately.

Note that the installation position of the LF transmitter in the vehicle Hv may be represented, for example, as a point on two-dimensional coordinates (hereinafter, the vehicle coordinate system) centered on an any position of the vehicle Hv and parallel to both the width direction and the front-rear direction of the vehicle Hv. The X axis forming the vehicle coordinate system may be parallel to the vehicle width direction of the vehicle Hv, and the Y axis may be parallel to the front-rear direction. The center of the vehicle coordinate system may be, for example, the center of the rear wheel axle. The installation position information about the LF transmitter or the like in the vehicle Hv may be stored in the storage 43 or the like in association with the position where each seat is provided. The vehicle coordinate system may be a three-dimensional coordinate system including a Z axis parallel to the vehicle height direction.

[Modification of System Configuration]

Although the case where the in-vehicle system 2 and the smart key 3 are configured to perform wireless communication using both the LF band signal and the UHF band signal is described above, the communication method of the in-vehicle system 2 and the smart key 3 is not limited thereto.

For example, each of the in-vehicle system 2 and the smart key 3 may be configured to be able to perform communication (hereinafter, short distance communication) conforming to a predetermined short distance wireless communication standard with a communicable distance of, for example, about 10 meters. Examples of the short distance communication standard here can include Bluetooth Low Energy, Wi-Fi (registered trademark), ZigBee (registered trademark), and the like. The short distance communication method can include ultra wide band-impulse radio (UWB-IR).

Figure 13:
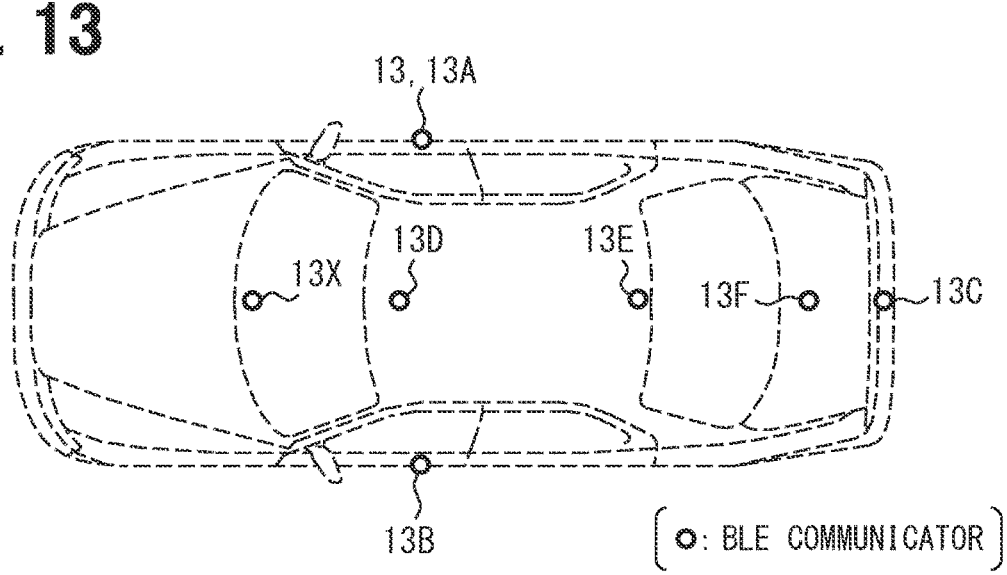
FIG. 13 is a diagram illustrating a modification of the system configuration.

For example, as illustrated in FIG. 13, the in-vehicle system 2 may be configured to perform wireless communication with the smart key 3 using a plurality of BLE communicators 13. Each BLE communicator 13 is a wireless communicator configured to perform wireless communication (hereinafter, BLE communication) conforming to the Bluetooth Low Energy standard. The position identification unit F4 may be configured to determine the position of the smart key 3 based on the communication status between the smart key 3 and each BLE communicator 13. As a premise of the present modification, it is assumed that the smart key 3 is configured to be able to perform wireless communication conforming to the BLE standard. For example, a smartphone or a wearable device can be employed as the smart key 3.

Note that a BLE communicator 13A illustrated in FIG. 13 is the BLE communicator 13 provided on the right front seat door (thereafter, the front right door). For example, the BLE communicator 13A is disposed near the outer door handle of the front right door. In the description of the mounting position of the BLE communicator 13, the "vicinity or near"

of a certain member refers to a range within, for example, 30 cm from the member. For example, the vicinity of the outer door handle refers to a range within 30 cm from the outer door handle. The vicinity of the door handle also includes the inside of the door handle.

The BLE communicator 13A may be disposed at a rocker portion below the front right door, a right pillar (for example, a B pillar), a portion, of a roof portion of the vehicle Hv, with which the upper end of the front right door is in contact, or the like. The rocker portion also includes an inner portion of the side sill cover. Further, the BLE communicator 13A may be disposed at an outer door handle for a right rear seat or a fender. A BLE communicator 13B is the BLE communicator 13 disposed at a position (in other words, bilaterally symmetrical) similar to that of the BLE communicator 13A on the left side. For example, the BLE communicator 13B is provided at a left front seat door (thereafter, the front left door). A BLE communicator 13C is disposed at the center of the rear bumper in the left-right direction. Note that the mounting position of the BLE communicator 13C may be near a rear number plate, near a rear window, near a door handle for a trunk, or the like. The BLE communicators 13A to 12C correspond to vehicle exterior communicators.

A BLE communicator 13D is, for example, the BLE communicator 13 disposed at a center console. Note that the installation position of the BLE communicator 13D may be disposed, for example, at the foot of the driver seat or the side face of the driver seat door in the vehicle compartment. The BLE communicator 13D may be disposed at a position where the vehicle exterior can be seen through the window portion. For example, the BLE communicator 13D may be disposed near the upper end of the windshield or near the front end of the ceiling portion, such as near a rearview mirror or near an overhead console. A BLE communicator 13E is a BLE communicator 13 disposed at the vehicle rear end of the ceiling portion such as the upper end of the rear glass. A BLE communicator 13F is the BLE communicator 13 disposed at the center of the floor of the luggage room. The BLE communicators 13D to 13F correspond to vehicle interior communicators.

A BLE communicator 13X is the BLE communicator 13 incorporated in the smart ECU 4. Note that the smart ECU 4 is accommodated inside an instrument panel, for example. A place to accommodate the smart ECU 4 can be located at the inner side of the upper face portion of the instrument panel, the inner side of the center garnish, or the like. The smart ECU 4 is only required to be disposed such that the BLE communicator 13X can communicate with the smart key 3 present in the vicinity of the vehicle outside the vehicle compartment and in a vehicle compartment. The BLE communicator 13X can be included in the vehicle interior communicator.

The BLE communicator 13X is, for example, a BLE communicator 13 configured to perform a key exchange protocol with the smart key 3. The BLE communicator 13 performing the key exchange protocol with the smart key 3 corresponds to a BLE communicator 13 subjected to the pairing process based on the operation of the user or the like. The terminal information, which is information about the smart key 3 acquired by the pairing, is stored in a nonvolatile memory included in the BLE communicator 13X. The terminal information is, for example, a key exchanged by pairing, a terminal ID, or the like. In a case where the vehicle Hv is shared by a plurality of users, the terminal information about the smart key 3 owned by each user is stored. Furthermore, in a case where the vehicle Hv is a shared car or a rental car, the terminal information may be distributed from an external server and temporarily stored in the BLE communicator 13X. The same applies not only to the BLE communicator 13X but also to the other BLE communicators 13.

The installation position of each BLE communicator 13 can be changed as appropriate. Furthermore, the number of the BLE communicators 13 included in the in-vehicle system 2 may be 9 or less, such as 3 or 5, or may be 10 or more, such as 12. The in-vehicle system 2 may include the BLE communicator 13 disposed at the inner side the front grille, for example, the back side of the front emblem. The BLE communicator 13 may be disposed at a roof top or the like.

Each BLE communicator 13 includes, for example, a received signal strength detection unit that sequentially detects strength of each signal transmitted from the smart key 3, and is configured to sequentially report the detected received signal strength to the smart ECU 4 in association with the key ID included in the received data.

The storage 43 of the smart ECU 4 stores data (thereafter, mounting position data) indicating the mounting position and attitude of each BLE communicator 13 in the vehicle Hv. The mounting position of each BLE communicator 13 can be expressed as a point in the vehicle coordinate system. Note that, as a more preferable aspect in the present embodiment, a unique communicator number is set to each BLE communicator 13. The communicator number functions as information for identifying the plurality of BLE communicators 13.

As described above, in a case where the plurality of BLE communicators 13 is provided, the position identification unit F4 estimates the position of the smart key 3 based on the received signal strength of the signal from the smart key 3 in each BLE communicator 13 and the mounting position of each BLE communicator 13. For example, the position identification unit F4 converts received signal strength information about a signal from the smart key 3 observed by each BLE communicator 13 into distance information, and generates distance information from each BLE communicator 13 to the smart key 3. Then, the position of the smart key 3 is calculated by integrating the distance information from each BLE communicator 13 to the smart key 3. For example, the position identification unit F4 identifies the position of the smart key 3 with respect to the reference point of the vehicle Hv by the principle of triangulation or triangulation based on the distance calculated from each of the reception intensities observed by the three or more BLE communicators 13 and the mounting position of the BLE communicator 13. The conversion from the received signal strength to the distance information can be realized using a model equation in which the received signal strength attenuates in inverse proportion to the cube or the square of the distance. The position of the smart key 3 with respect to the vehicle Hv can be expressed as a point in the vehicle coordinate system.

In performing the position estimation by the RSSI method, all the BLE communicators 13 need not perform bidirectional communication with the smart key 3. For example, the BLE communicators 13 other than the BLE communicator 13X may be configured to perform only observation of received signal strength. For convenience, in a system configuration in which the number of communicators that perform bidirectional communication with the smart key 3 among the plurality of BLE communicators 13 is limited to one, the BLE communicator 13 configured to play a role of performing bidirectional communication with the smart key 3 is referred to as a gateway communicator. In the present embodiment, the BLE communicator 13X corresponds to the gateway communicator. The gateway communicator may be a BLE communicator 13 disposed outside the smart ECU 4. The BLE communicator 13 as the gateway communicator may be fixed or may be dynamically changed by the smart ECU 4.

Of course, the position identification unit F4 may estimate the position of the smart key 3 by a method other than the RSSI method. For example, the position identification unit F4 may identify the position of the smart key 3 with respect to the vehicle Hv using an angle of arrival (AoA) method using the arrival angle of the radio wave. In addition, it may identify the position of the smart key 3 with respect to the vehicle Hv using a time of flight (ToF) method in which localization is performed using the flight time of radio waves. In addition, it may identify the position of the smart key 3 with respect to the vehicle Hv by using a time difference of arrival (TDOA) method in which localization is performed using an arrival time difference of radio waves. A signal round-trip time (so-called TOA: Time of Arrival or RTT: Round-Trip Time) method, which is a time from transmission of the response request signal to receiving of the response signal, may be used. In addition, the in-vehicle system 2 and the smart key 3 may be configured to calculate the position of the smart key 3 by, for example, a plurality of types of methods.

The position estimation of the smart key 3 by the position identification unit F4 may be performed when a predetermined event occurs, for example, when the opening operation is performed, when the door is actually opened, when the seating sensor 83 detects that a person is seated, or when the door is closed. Further, the position estimation of the smart key 3 by the position identification unit F4 may be sequentially performed, for example, every 200 milliseconds while the communication connection between the BLE communicator 13X and the smart key 3 is established. In this case, the position identification unit F4 can perform the detection of the target device and the identification of the target seat/target door using the position information calculated within a predetermined valid time from the time point of occurrence of the event. The valid time is, for example, 300 milliseconds or one second. In the scene where the position of the smart key 3 outside the vehicle compartment is identified, the communication result in the vehicle exterior communicator may be mainly used, and the communication result in the vehicle interior communicator is not essential. In the scene where the position of the smart key 3 in the vehicle compartment is identified, the communication result in the vehicle interior communicator may be mainly used, and the communication result in the vehicle exterior communicator is not essential. However, in order to improve the position determination accuracy, it is preferable to use a communication status between the smart key 3 and a larger number of BLE communicators 13. This is because the position determination accuracy increases as the number of the BLE communicators 13 as anchor nodes increases.

Further, the in-vehicle system 2 may be configured to form a communication area for each BLE communicator using a Class 3 BLE communicator having a communication distance of about one m. In this case, the position identification unit F4 may determine that the smart key 3 is present in the communication area of the BLE communicator 13 that can communicate with the smart key 3.

The in-vehicle system 2 may be configured to perform data communication with the smart key 3 using the BLE, while identifying the position of the smart key through UWB-IR communication (hereinafter, UWB communication). The UWB-IR is an abbreviation for ultra wide band-impulse radio. Hereinafter, a system configuration using UWB communication for position estimation of the smart key 3 is referred to as a UWB combined configuration.

Figure 14:
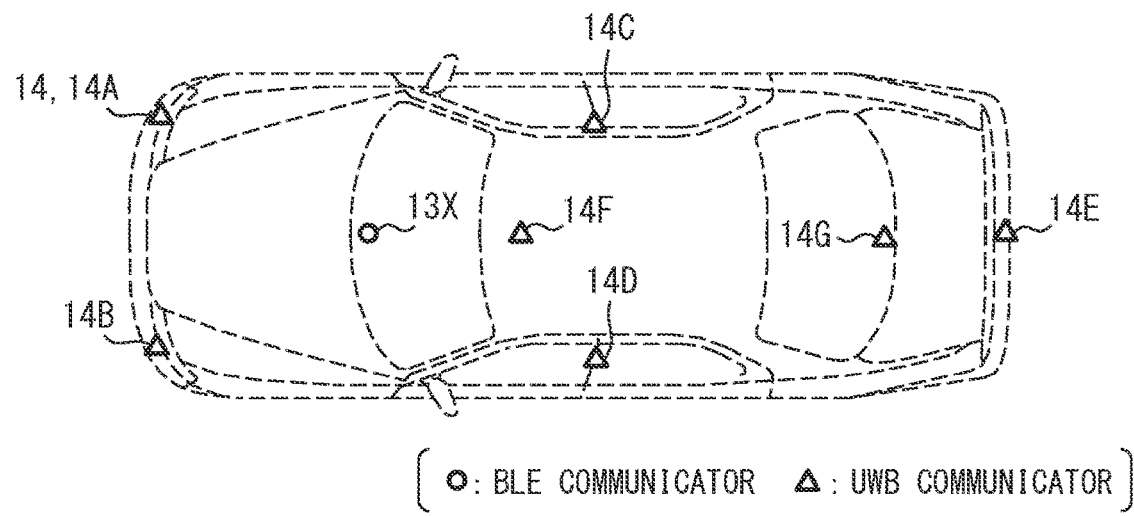
FIG. 14 is a diagram illustrating a modification of the system configuration.

In the UWB combined configuration, the smart key 3 includes a circuit module for transmitting and receiving an impulsive radio wave (hereinafter, the impulse signal) used in UWB communication. As illustrated in FIG. 14, the in-vehicle system 2 includes a plurality of communication modules (hereinafter, a UWB communicator 14) for receiving an impulse signal used in UWB communication. The impulse signal used in the UWB communication is a signal having a pulse width of an extremely short time such as 2 nanoseconds. The UWB communication may also be referred to as ultra-wideband communication. The frequency band that can be used for the UWB communication is, for example, 3.1 GHz to 10.6 GHz, 3.4 GHz to 4.8 GHz, 7.25 GHz to 10.6 GHz, 22 GHz to 29 GHz, or the like.

The smart ECU 4 having the UWB combined configuration acquires data from the smart key 3 received by the UWB communicator 14. In addition, the smart ECU 4 generates data addressed to the smart key 3 to output the data to the UWB communicator 14. Thus, the pulse sequence signal corresponding to the desired data is wirelessly transmitted from each UWB communicator 14 in order. Here, the pulse sequence signal means a signal sequence in which a plurality of impulse signals is disposed at predetermined time intervals, the signal sequence being generated by modulating transmission data by an on-off modulation system. Further, the smart ECU 4 causes any UWB communicator 14 to transmit an impulse signal based on an instruction from the position identification unit F4. The UWB communicator 14 that transmits the impulse signal is selected by the position identification unit F4.

The position identification unit F4 estimates the distance from each UWB communicator 14 to the smart key 3 by transmitting and receiving an impulse signal to and from the smart key 3 from each of the plurality of UWB communicators 14 in a predetermined order. For the estimation of the distance, a ToF method or the like can be used. Then, the position of the smart key 3 is estimated based on the distance information from each UWB communicator 14 to the smart key 3 and the mounting position data of each UWB communicator 14. As described above, even when the UWB communicator 14 is used instead of the BLE communicator 13, the terminal position can be estimated. That is, the communication facility such as the BLE communicator 13 in the present disclosure can be replaced with the UWB communicator 14.

Note that FIG. 14 illustrates an example of the installation position of the UWB communicator 14. A UWB communicator 14A illustrated in FIG. 14 is the UWB communicator 14 disposed at the right corner portion of the front bumper. A UWB communicator 14B is the UWB communicator 14 disposed at the left corner portion of the front bumper. A UWB communicator 14C is the UWB communicator 14 disposed at the B-pillar on the right side. A UWB communicator 14D is the UWB communicator 14 disposed at the B pillar on the left side. A UWB communicator 14E is an UWB communicator 14 disposed, for example, near a door handle for a trunk at the rear end of the vehicle. A UWB communicator 14F is the UWB communicator 14 disposed near the upper end of the windshield. A UWB communicator 14G is the UWB communicator 14 disposed near the lower end of the rear glass. The UWB communicators 14A to 14E correspond to vehicle exterior communicators, and the UWB communicators 14F to 14G correspond to vehicle interior communicators.

<Additional Remarks>

The controller including the smart ECU 4 and the method thereof described in the present disclosure may be realized by a dedicated computer constituting a processor programmed to execute one or a plurality of functions embodied by a computer program. Further, the device and the method thereof described in the present disclosure may be realized by using a dedicated hardware logic circuit. Furthermore, the device and the method thereof described in the present disclosure may be realized by one or more dedicated computers configured by a combination of a processor that executes a computer program and one or more hardware logic circuits. Furthermore, the computer program may be stored in a computer-readable non-transition tangible storage medium as an instruction executed by a computer. Means and/or functions provided by the smart ECU 4 or the like can be provided by software stored in a tangible memory device and a computer that executes the software, only software, only hardware, or a combination thereof. For example, some or all of the functions of the smart ECU 4 may be realized as hardware. An aspect in which a certain function is realized as hardware includes an aspect in which the function is realized using one or more ICs or the like. The smart ECU 4 may be realized by using an MPU, a GPU, or a data flow processor (DFP) instead of the CPU. The smart ECU 4 may be realized by combining a plurality of types of arithmetic processing devices such as a CPU, an MPU, and a GPU. Some or all of the functions of the smart ECU 4 may be realized using a system-on-chip (SoC). Further, the various processing units may be realized by using a field-programmable gate array (FPGA) or an application specific integrated circuit (ASIC). The control program may be stored in a non-transitory tangible storage medium. As a storage medium of the control program, various storage media such as a hard disk drive (HDD), a solid state drive (SSD), a flash memory, and a secure digital (SD) card can be used.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A seating position determination system configured to determine a seating position of each of users boarding a vehicle based on a receiving situation of wireless signals from mobile devices carried by the users, the seating position determination system comprising:
    vehicle exterior communicators disposed at an outer face portion of the vehicle and configured to wirelessly communicate with the mobile devices;
    at least one vehicle interior communicator disposed in a vehicle compartment of the vehicle and configured to wirelessly communicate with the mobile devices; and
    a controller configured to control operations of the vehicle exterior communicators and the at least one vehicle interior communicator, wherein
    the controller includes
        a mobile device detection unit configured to, based on a communication result between the vehicle exterior communicators and the mobile devices,
            detect a target device that is a mobile device positioned outside the vehicle compartment and within a predetermined distance from a door of the vehicle among the mobile devices, and
            identify a position of the target device outside the vehicle compartment,
        a vehicle state acquisition unit configured to acquire a boarding signal from a predetermined in-vehicle sensor, the boarding signal indicating a possibility that any of the users has boarded the vehicle,
        an entry determination unit configured to determine whether the target device has entered the vehicle compartment by causing the at least one vehicle interior communicator to communicate with the target device based on the vehicle state acquisition unit acquiring the boarding signal, and
        a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, and
    the vehicle state acquisition unit is configured to, based on an output signal of a sensor provided at each of doors of the vehicle,
        detect an open/closed state of each of the doors, and
        detect an opening operation that is a predetermined operation for opening one of the doors,
    the seating position determination system further comprising a target door setting unit configured to set a target door as a door opened via the opening operation detected by the vehicle state acquisition unit, wherein
    the mobile device detection unit is configured to detect the target device using the vehicle exterior communicators based on the vehicle state acquisition unit detecting the opening operation, and
    the entry determination unit is configured to determine whether the target device has entered the vehicle compartment by using the at least one vehicle interior communicator based on the vehicle state acquisition unit detecting that the target door is closed.

2. The seating position determination system according to claim 1, wherein
    the vehicle state acquisition unit is configured to, based on an output signal of a sensor provided at each of doors of the vehicle,
        detect an open/closed state of each of the doors, and
        detect an opening operation that is a predetermined operation for opening one of the doors,
    the seating position determination system further comprising a target door setting unit configured to set a target door as a door opened via the opening operation detected by the vehicle state acquisition unit, wherein
    the mobile device detection unit is configured to search for the target device that is the mobile device present near the target door by causing a vehicle exterior communicator corresponding to the target door to transmit response request signals directed to the respective mobile devices in a predetermined order based on the vehicle state acquisition unit detecting the opening operation, and
    the entry determination unit is configured to determine whether the target device has entered the vehicle compartment by causing the at least one vehicle interior communicator to transmit a response request signal directed to the target device based on the vehicle state acquisition unit detecting that the target door is closed.

3. The seating position determination system according to claim 1, wherein
the mobile device detection unit is configured to exclude a mobile device, which is determined by the entry determination unit to have entered the vehicle compartment among the mobile devices, from a target to be searched for outside the vehicle compartment.

4. The seating position determination system according to claim 1, wherein
the controller is configured to unlock a door of the vehicle based on the controller receiving a wireless signal to unlock the door from one of the mobile devices,
the seating position determination system further comprising:
an unlocking person identification unit configured to identify an unlocking person who has unlocked the door among the users based on identification information about a mobile device that has been used to unlock the door among the mobile devices; and
a recognition state notification unit configured to perform a process for displaying an image indicating a determination result of the seating position determination unit on a display, wherein
the seating position determination unit is configured to determine that a seating position of the unlocking person is a driver seat, and
the recognition state notification unit is configured to display an image indicating that a seated person on the driver seat is determined to be the unlocking person on the display when the door is unlocked by the wireless signal.

5. The seating position determination system according to claim 1, wherein
the vehicle state acquisition unit is configured to detect a predetermined unlocking operation for unlocking doors of the vehicle based on an output signal from a sensor provided at each of the doors, and
the controller is configured to unlock a door among the doors based on the vehicle state acquisition unit detecting the unlocking operation at the door,
the seating position determination system further comprising:
an unlocking person identification unit configured to identify an unlocking person who has unlocked the door among the users based on identification information about a mobile device that has been used to unlock the door among the mobile devices; and
a recognition state notification unit configured to perform a process for displaying an image indicating a determination result of the seating position determination unit on a display, wherein
the seating position determination unit is configured to determine that a seating position of the unlocking person is a driver seat, and
the recognition state notification unit is configured to display an image indicating that a seated person on the driver seat is determined to be the unlocking person on the display when the door at which the unlocking operation has been performed is not a door for the driver seat.

6. The seating position determination system according to claim 1, wherein
the vehicle state acquisition unit is configured to detect a predetermined unlocking operation for unlocking doors of the vehicle based on an output signal from a sensor provided at each of the doors,
the controller is configured to
unlock a door among the doors based on the vehicle state acquisition unit detecting the unlocking operation at the door, and
unlock the door based on the controller receiving an unlocking instruction signal that is a wireless signal to unlock the door from one of the mobile devices, and
the controller is configured to change a system response related to determination of a seating position between a case where unlocking is performed based on the unlocking operation performed at a door for a driver seat and a case where unlocking is performed based on receiving of the unlocking instruction signal.

7. The seating position determination system according to claim 1, wherein
the seating position determination unit is configured to determine a seated person on a seat corresponding to a target door at time points, the target door being a door at which an opening operation has been performed, the opening operation being a predetermined operation for opening a door, the time points including a time point when the vehicle state acquisition unit detects the opening operation and a time point when the vehicle state acquisition unit detects closing of the target door, and
the seating position determination unit is configured to discard a past result of determination of a seating position for a user and use a latest result of determination of the seating position for the same user when the latest result is different from the past result.

8. The seating position determination system according to claim 1, further comprising:
a user setting storage unit configured to store vehicle setting data for each user, the vehicle setting data indicating a user-specific setting for the vehicle;
a personal setting reflection unit configured to automatically adjust an environment setting of the target seat based on the vehicle setting data of the user who has been determined to be a seated person on the target seat by the seating position determination unit; and
an unlocking person identification unit configured to identify an unlocking person who has unlocked a door of the vehicle among the users based on identification information about a mobile device that has been used for unlocking the door among the mobile devices, wherein
the seating position determination unit configured to determine a seating position of the unlocking person to be a driver seat when a seated person on a driver seat is still unknown at a time point when the door is unlocked, and
the personal setting reflection unit is configured to automatically adjust the environment setting of the driver seat based on the vehicle setting data of the unlocking person.

9. The seating position determination system according to claim 1, wherein
the vehicle state acquisition unit is configured to detect a use state of a seat of the vehicle based on an output signal of a seating sensor indicating whether a person is seated on the seat,
the seating position determination system further comprising a determination result correction unit configured to determine a seated person on the target seat to be unknown when a corresponding door has been closed and the vehicle state acquisition unit determines the target seat to be vacant, the corresponding door being a door of the vehicle corresponding to the seat which has been determined to be the seating position of the user as the seated person by the seating position determination unit.

10. A seating position determination system configured to determine a seating position of each of users boarding a vehicle based on a receiving situation of wireless signals from mobile devices carried by the users, the seating position determination system comprising:

vehicle exterior communicators disposed at an outer face portion of the vehicle and configured to wirelessly communicate with the mobile devices;

at least one vehicle interior communicator disposed in a vehicle compartment of the vehicle and configured to wirelessly communicate with the mobile devices; and a controller configured to control operations of the vehicle exterior communicators and the at least one vehicle interior communicator, wherein the controller includes a mobile device detection unit configured to, based on a communication result between the vehicle exterior communicators and the mobile devices, detect a target device that is a mobile device positioned outside the vehicle compartment and within a predetermined distance from a door of the vehicle among the mobile devices, and identify a position of the target device outside the vehicle compartment, a vehicle state acquisition unit configured to acquire a boarding signal from a predetermined in-vehicle sensor, the boarding signal indicating a possibility that any of the users has boarded the vehicle, an entry determination unit configured to determine whether the target device has entered the vehicle compartment by causing the at least one vehicle interior communicator to communicate with the target device based on the vehicle state acquisition unit acquiring the boarding signal, and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, and the vehicle state acquisition unit is configured to, based on an output signal of a sensor provided at each of doors of the vehicle, detect an open/closed state of each of the doors, and detect an opening operation that is a predetermined operation for opening one of the doors, the seating position determination system further comprising a target door setting unit configured to set a target door as a door opened via the opening operation detected by the vehicle state acquisition unit, wherein the mobile device detection unit is configured to search for the target device that is the mobile device present near the target door by causing a vehicle exterior communicator corresponding to the target door to transmit response request signals directed to the respective mobile devices in a predetermined order based on the vehicle state acquisition unit detecting the opening operation, and the entry determination unit is configured to determine whether the target device has entered the vehicle compartment by causing the at least one vehicle interior communicator to transmit a response request signal directed to the target device based on the vehicle state acquisition unit detecting that the target door is closed.

11. A seating position determination system configured to determine a seating position of each of users boarding a vehicle based on a receiving situation of wireless signals from mobile devices carried by the users, the seating position determination system comprising:

vehicle exterior communicators disposed at an outer face portion of the vehicle and configured to wirelessly communicate with the mobile devices;

at least one vehicle interior communicator disposed in a vehicle compartment of the vehicle and configured to wirelessly communicate with the mobile devices; and a controller configured to control operations of the vehicle exterior communicators and the at least one vehicle interior communicator, wherein the controller includes a mobile device detection unit configured to, based on a communication result between the vehicle exterior communicators and the mobile devices, detect a target device that is a mobile device positioned outside the vehicle compartment and within a predetermined distance from a door of the vehicle among the mobile devices, and identify a position of the target device outside the vehicle compartment, a vehicle state acquisition unit configured to acquire a boarding signal from a predetermined in-vehicle sensor, the boarding signal indicating a possibility that any of the users has boarded the vehicle, an entry determination unit configured to determine whether the target device has entered the vehicle compartment by causing the at least one vehicle interior communicator to communicate with the target device based on the vehicle state acquisition unit acquiring the boarding signal, and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, and the controller is configured to unlock a door of the vehicle based on the controller receiving a wireless signal to unlock the door from one of the mobile devices, the seating position determination system further comprising:

an unlocking person identification unit configured to identify an unlocking person who has unlocked the door among the users based on identification information about a mobile device that has been used to unlock the door among the mobile devices; and a recognition state notification unit configured to perform a process for displaying an image indicating a determination result of the seating position determination unit on a display, wherein the seating position determination unit is configured to determine that a seating position of the unlocking person is a driver seat, and the recognition state notification unit is configured to display an image indicating that a seated person on the driver seat is determined to be the unlocking person on the display when the door is unlocked by the wireless signal.

12. A seating position determination system configured to determine a seating position of each of users boarding a vehicle based on a receiving situation of wireless signals from mobile devices carried by the users, the seating position determination system comprising:

vehicle exterior communicators disposed at an outer face portion of the vehicle and configured to wirelessly communicate with the mobile devices;

at least one vehicle interior communicator disposed in a vehicle compartment of the vehicle and configured to wirelessly communicate with the mobile devices; and a controller configured to control operations of the vehicle exterior communicators and the at least one vehicle interior communicator, wherein the controller includes a mobile device detection unit configured to, based on a communication result between the vehicle exterior communicators and the mobile devices,
 detect a target device that is a mobile device positioned outside the vehicle compartment and within a predetermined distance from a door of the vehicle among the mobile devices, and
 identify a position of the target device outside the vehicle compartment, a vehicle state acquisition unit configured to acquire a boarding signal from a predetermined in-vehicle sensor, the boarding signal indicating a possibility that any of the users has boarded the vehicle, an entry determination unit configured to determine whether the target device has entered the vehicle compartment by causing the at least one vehicle interior communicator to communicate with the target device based on the vehicle state acquisition unit acquiring the boarding signal, and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, the vehicle state acquisition unit is configured to detect a predetermined unlocking operation for unlocking doors of the vehicle based on an output signal from a sensor provided at each of the doors, and the controller is configured to unlock a door among the doors based on the vehicle state acquisition unit detecting the unlocking operation at the door, the seating position determination system further comprising:

an unlocking person identification unit configured to identify an unlocking person who has unlocked the door among the users based on identification information about a mobile device that has been used to unlock the door among the mobile devices; and a recognition state notification unit configured to perform a process for displaying an image indicating a determination result of the seating position determination unit on a display, wherein the seating position determination unit is configured to determine that a seating position of the unlocking person is a driver seat, and the recognition state notification unit is configured to display an image indicating that a seated person on the driver seat is determined to be the unlocking person on the display when the door at which the unlocking operation has been performed is not a door for the driver seat.

13. A seating position determination system configured to determine a seating position of each of users boarding a vehicle based on a receiving situation of wireless signals from mobile devices carried by the users, the seating position determination system comprising:

vehicle exterior communicators disposed at an outer face portion of the vehicle and configured to wirelessly communicate with the mobile devices;

at least one vehicle interior communicator disposed in a vehicle compartment of the vehicle and configured to wirelessly communicate with the mobile devices; and a controller configured to control operations of the vehicle exterior communicators and the at least one vehicle interior communicator, wherein the controller includes a mobile device detection unit configured to, based on a communication result between the vehicle exterior communicators and the mobile devices,
 detect a target device that is a mobile device positioned outside the vehicle compartment and within a predetermined distance from a door of the vehicle among the mobile devices, and
 identify a position of the target device outside the vehicle compartment, a vehicle state acquisition unit configured to acquire a boarding signal from a predetermined in-vehicle sensor, the boarding signal indicating a possibility that any of the users has boarded the vehicle, an entry determination unit configured to determine whether the target device has entered the vehicle compartment by causing the at least one vehicle interior communicator to communicate with the target device based on the vehicle state acquisition unit acquiring the boarding signal, and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, the seating position determination system further comprising:

a user setting storage unit configured to store vehicle setting data for each user, the vehicle setting data indicating a user-specific setting for the vehicle;

a personal setting reflection unit configured to automatically adjust an environment setting of the target seat based on the vehicle setting data of the user who has been determined to be a seated person on the target seat by the seating position determination unit; and an unlocking person identification unit configured to identify an unlocking person who has unlocked a door of the vehicle among the users based on identification information about a mobile device that has been used for unlocking the door among the mobile devices, wherein the seating position determination unit configured to determine a seating position of the unlocking person to be a driver seat when a seated person on a driver seat is still unknown at a time point when the door is unlocked, and the personal setting reflection unit is configured to automatically adjust the environment setting of the driver seat based on the vehicle setting data of the unlocking person.

14. A vehicle controller configured to determine a seating position of each of users of a vehicle based on a receiving situation of a wireless signal from each of mobile devices carried by the users, the vehicle controller comprising:

an in-vehicle communication unit configured to communicate with
vehicle exterior communicators disposed at an outer face portion of the vehicle and configured to wirelessly communicate with the mobile devices, and
at least one vehicle interior communicator disposed in a vehicle compartment of the vehicle and configured to wirelessly communicate with the mobile devices;

a mobile device detection unit configured to, based on a communication result between the vehicle exterior communicators and the mobile devices,
detect a target device that is a mobile device positioned outside the vehicle compartment and within a predetermined distance from a door of the vehicle among the mobile devices, and
identify a position of the target device outside the vehicle compartment;

a vehicle state acquisition unit configured to acquire a boarding signal from a predetermined in-vehicle sensor, the boarding signal indicating a possibility that any of the users has boarded the vehicle;

an entry determination unit configured to determine whether the target device has entered the vehicle compartment by causing the at least one vehicle interior communicator to communicate with the target device based on the vehicle state acquisition unit acquiring the boarding signal; and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, and the vehicle state acquisition unit is configured to, based on an output signal of a sensor provided at each of doors of the vehicle,
detect an open/closed state of each of the doors, and
detect an opening operation that is a predetermined operation for opening one of the doors, the vehicle controller further comprising a target door setting unit configured to set a target door as a door opened via the opening operation detected by the vehicle state acquisition unit, wherein the mobile device detection unit is configured to detect the target device using the vehicle exterior communicators based on the vehicle state acquisition unit detecting the opening operation, and the entry determination unit is configured to determine whether the target device has entered the vehicle compartment by using the at least one vehicle interior communicator based on the vehicle state acquisition unit detecting that the target door is closed.

15. A vehicle controller configured to determine a seating position of each of users of a vehicle based on a receiving situation of a wireless signal from each of mobile devices carried by the users, the vehicle controller comprising:

an in-vehicle communication unit configured to communicate with
vehicle exterior communicators disposed at an outer face portion of the vehicle and configured to wirelessly communicate with the mobile devices, and
at least one vehicle interior communicator disposed in a vehicle compartment of the vehicle and configured to wirelessly communicate with the mobile devices;

a mobile device detection unit configured to, based on a communication result between the vehicle exterior communicators and the mobile devices,
detect a target device that is a mobile device positioned outside the vehicle compartment and within a predetermined distance from a door of the vehicle among the mobile devices, and
identify a position of the target device outside the vehicle compartment;

a vehicle state acquisition unit configured to acquire a boarding signal from a predetermined in-vehicle sensor, the boarding signal indicating a possibility that any of the users has boarded the vehicle;

an entry determination unit configured to determine whether the target device has entered the vehicle compartment by causing the at least one vehicle interior communicator to communicate with the target device based on the vehicle state acquisition unit acquiring the boarding signal; and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, and the vehicle state acquisition unit is configured to, based on an output signal of a sensor provided at each of doors of the vehicle,
detect an open/closed state of each of the doors, and
detect an opening operation that is a predetermined operation for opening one of the doors, the vehicle controller further comprising a target door setting unit configured to set a target door as a door opened via the opening operation detected by the vehicle state acquisition unit, wherein the mobile device detection unit is configured to search for the target device that is the mobile device present near the target door by causing a vehicle exterior communicator corresponding to the target door to transmit response request signals directed to the respective mobile devices in a predetermined order based on the vehicle state acquisition unit detecting the opening operation, and the entry determination unit is configured to determine whether the target device has entered the vehicle compartment by causing the at least one vehicle interior communicator to transmit a response request signal directed to the target device based on the vehicle state acquisition unit detecting that the target door is closed.

16. A vehicle controller configured to determine a seating position of each of users of a vehicle based on a receiving situation of a wireless signal from each of mobile devices carried by the users, the vehicle controller comprising:
- an in-vehicle communication unit configured to communicate with
  - vehicle exterior communicators disposed at an outer face portion of the vehicle and configured to wirelessly communicate with the mobile devices, and
  - at least one vehicle interior communicator disposed in a vehicle compartment of the vehicle and configured to wirelessly communicate with the mobile devices;
- a mobile device detection unit configured to, based on a communication result between the vehicle exterior communicators and the mobile devices,
  - detect a target device that is a mobile device positioned outside the vehicle compartment and within a predetermined distance from a door of the vehicle among the mobile devices, and
  - identify a position of the target device outside the vehicle compartment;
- a vehicle state acquisition unit configured to acquire a boarding signal from a predetermined in-vehicle sensor, the boarding signal indicating a possibility that any of the users has boarded the vehicle;
- an entry determination unit configured to determine whether the target device has entered the vehicle compartment by causing the at least one vehicle interior communicator to communicate with the target device based on the vehicle state acquisition unit acquiring the boarding signal; and
- a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, and the vehicle controller is configured to unlock a door of the vehicle based on the vehicle controller receiving a wireless signal to unlock the door from one of the mobile devices, the vehicle controller further comprising:
- an unlocking person identification unit configured to identify an unlocking person who has unlocked the door among the users based on identification information about a mobile device that has been used to unlock the door among the mobile devices; and
- a recognition state notification unit configured to perform a process for displaying an image indicating a determination result of the seating position determination unit on a display, wherein the seating position determination unit is configured to determine that a seating position of the unlocking person is a driver seat, and the recognition state notification unit is configured to display an image indicating that a seated person on the driver seat is determined to be the unlocking person on the display when the door is unlocked by the wireless signal.

17. A vehicle controller configured to determine a seating position of each of users of a vehicle based on a receiving situation of a wireless signal from each of mobile devices carried by the users, the vehicle controller comprising:
- an in-vehicle communication unit configured to communicate with
  - vehicle exterior communicators disposed at an outer face portion of the vehicle and configured to wirelessly communicate with the mobile devices, and
  - at least one vehicle interior communicator disposed in a vehicle compartment of the vehicle and configured to wirelessly communicate with the mobile devices;
- a mobile device detection unit configured to, based on a communication result between the vehicle exterior communicators and the mobile devices,
  - detect a target device that is a mobile device positioned outside the vehicle compartment and within a predetermined distance from a door of the vehicle among the mobile devices, and
  - identify a position of the target device outside the vehicle compartment;
- a vehicle state acquisition unit configured to acquire a boarding signal from a predetermined in-vehicle sensor, the boarding signal indicating a possibility that any of the users has boarded the vehicle;
- an entry determination unit configured to determine whether the target device has entered the vehicle compartment by causing the at least one vehicle interior communicator to communicate with the target device based on the vehicle state acquisition unit acquiring the boarding signal; and
- a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, the vehicle state acquisition unit is configured to detect a predetermined unlocking operation for unlocking doors of the vehicle based on an output signal from a sensor provided at each of the doors, and the vehicle controller is configured to unlock a door among the doors based on the vehicle state acquisition unit detecting the unlocking operation at the door, the vehicle controller further comprising:
- an unlocking person identification unit configured to identify an unlocking person who has unlocked the door among the users based on identification information about a mobile device that has been used to unlock the door among the mobile devices; and
- a recognition state notification unit configured to perform a process for displaying an image indicating a determination result of the seating position determination unit on a display, wherein the seating position determination unit is configured to determine that a seating position of the unlocking person is a driver seat, and the recognition state notification unit is configured to display an image indicating that a seated person on the driver seat is determined to be the unlocking person on the display when the door at which the unlocking operation has been performed is not a door for the driver seat.

18. A vehicle controller configured to determine a seating position of each of users of a vehicle based on a receiving situation of a wireless signal from each of mobile devices carried by the users, the vehicle controller comprising:
- an in-vehicle communication unit configured to communicate with vehicle exterior communicators disposed at an outer face portion of the vehicle and configured to wirelessly communicate with the mobile devices, and at least one vehicle interior communicator disposed in a vehicle compartment of the vehicle and configured to wirelessly communicate with the mobile devices;

a mobile device detection unit configured to, based on a communication result between the vehicle exterior communicators and the mobile devices, detect a target device that is a mobile device positioned outside the vehicle compartment and within a predetermined distance from a door of the vehicle among the mobile devices, and identify a position of the target device outside the vehicle compartment;

a vehicle state acquisition unit configured to acquire a boarding signal from a predetermined in-vehicle sensor, the boarding signal indicating a possibility that any of the users has boarded the vehicle;

an entry determination unit configured to determine whether the target device has entered the vehicle compartment by causing the at least one vehicle interior communicator to communicate with the target device based on the vehicle state acquisition unit acquiring the boarding signal; and a seating position determination unit configured to determine that a target seat is a seating position of a user corresponding to the target device based on the entry determination unit determining the target device to be present in the vehicle compartment, the target seat being a seat of the vehicle corresponding to the position of the target device identified outside the vehicle compartment by the mobile device detection unit, the vehicle controller further comprising:

a user setting storage unit configured to store vehicle setting data for each user, the vehicle setting data indicating a user-specific setting for the vehicle;

a personal setting reflection unit configured to automatically adjust an environment setting of the target seat based on the vehicle setting data of the user who has been determined to be a seated person on the target seat by the seating position determination unit; and an unlocking person identification unit configured to identify an unlocking person who has unlocked a door of the vehicle among the users based on identification information about a mobile device that has been used for unlocking the door among the mobile devices, wherein the seating position determination unit configured to determine a seating position of the unlocking person to be a driver seat when a seated person on a driver seat is still unknown at a time point when the door is unlocked, and the personal setting reflection unit is configured to automatically adjust the environment setting of the driver seat based on the vehicle setting data of the unlocking person.

* * * * *